(12) United States Patent
Xue et al.

(10) Patent No.: US 12,568,486 B2
(45) Date of Patent: Mar. 3, 2026

(54) DITHERING JITTERED PERIODIC TRAFFIC FOR SINGLE UPLINK CONFIGURED GRANT

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Ozcan Ozturk, San Diego, CA (US); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 666 days.

(21) Appl. No.: 17/917,018

(22) PCT Filed: May 9, 2020

(86) PCT No.: PCT/CN2020/089465
§ 371 (c)(1),
(2) Date: Oct. 5, 2022

(87) PCT Pub. No.: WO2021/226758
PCT Pub. Date: Nov. 18, 2021

(65) Prior Publication Data
US 2023/0354311 A1     Nov. 2, 2023

(51) Int. Cl.
*H04W 72/1268*     (2023.01)
*H04L 1/1812*     (2023.01)
(Continued)

(52) U.S. Cl.
CPC ....... *H04W 72/1268* (2013.01); *H04L 1/1819* (2013.01); *H04L 1/1822* (2013.01); *H04L 5/0044* (2013.01); *H04L 5/0055* (2013.01)

(58) Field of Classification Search
None
See application file for complete search history.

(56) References Cited

U.S. PATENT DOCUMENTS

| | | | | |
|---|---|---|---|---|
| 2014/0362832 A1* | 12/2014 | Rudolf | .............. | H04W 72/0446 |
| | | | | 370/336 |
| 2019/0254051 A1* | 8/2019 | Li | ........................ | H04L 5/0044 |

(Continued)

FOREIGN PATENT DOCUMENTS

| | | |
|---|---|---|
| CN | 109661036 A | 4/2019 |
| CN | 110535584 A | 12/2019 |
| CN | 111107660 A | 5/2020 |

OTHER PUBLICATIONS

Huawei, et al., "Enhanced UL configured grant transmissions", R1-1901562, 3rd Generation Partnership Project, RAN WG1 Meeting # 96, Athens, Greece, Feb. 2019. (Year: 2019).*

(Continued)

*Primary Examiner* — Mariela Vidal Carpio
(74) *Attorney, Agent, or Firm* — Harrity & Harrity, LLP

(57) ABSTRACT

Wireless communications systems and methods related to determining physical uplink shared channels (PUSCHs) for communicating in a configured grant resource are provided. A first communication device determines a PUSCH opportunity set including one or more PUSCH opportunities for communicating in a configured grant resource. The first wireless communication device communicates, with a second wireless communication device, a communication based on the determined PUSCH opportunity set.

35 Claims, 18 Drawing Sheets

(51) Int. Cl.
　　H04L 1/1822　　(2023.01)
　　H04L 5/00　　　(2006.01)

(56) References Cited

U.S. PATENT DOCUMENTS

| | | | | |
|---|---|---|---|---|
| 2019/0261287 | A1* | 8/2019 | Deenoo | H04W 52/34 |
| 2019/0261354 | A1 | 8/2019 | Fakoorian et al. | |
| 2020/0213978 | A1* | 7/2020 | Iyer | H04L 1/1812 |
| 2020/0260442 | A1* | 8/2020 | Yi | H04L 5/14 |
| 2020/0313793 | A1* | 10/2020 | Jung | H04L 1/189 |
| 2021/0084674 | A1* | 3/2021 | Wei | H04L 1/1822 |
| 2021/0160879 | A1* | 5/2021 | Lin | H04W 72/0453 |
| 2021/0219322 | A1* | 7/2021 | Chin | H04W 72/23 |
| 2021/0314982 | A1* | 10/2021 | Panteleev | H04L 5/0044 |
| 2021/0410177 | A1* | 12/2021 | Takeda | H04W 72/23 |
| 2022/0046557 | A1* | 2/2022 | MolavianJazi | H04W 24/10 |
| 2022/0132555 | A1* | 4/2022 | Blankenship | H04W 72/23 |
| 2022/0174666 | A1* | 6/2022 | Kou | H04L 5/0078 |
| 2022/0174736 | A1* | 6/2022 | Oviedo | H04L 5/0053 |
| 2022/0210823 | A1* | 6/2022 | Alfarhan | H04L 1/1822 |
| 2022/0217760 | A1* | 7/2022 | Iyer | H04L 5/0051 |
| 2022/0239417 | A1* | 7/2022 | Cheng | H04L 1/1835 |
| 2022/0353711 | A1* | 11/2022 | Ying | H04W 72/1263 |
| 2023/0088550 | A1* | 3/2023 | Wang | H04L 1/1822 |
| | | | | 370/329 |
| 2023/0164773 | A1* | 5/2023 | Alfarhan | H04W 74/0833 |
| | | | | 370/329 |

OTHER PUBLICATIONS

International Search Report and Written Opinion—PCT/CN2020/089465—ISA/EPO—Jan. 27, 2021.

Nokia, et al., "NR-U Uplink Signals and Channels", 3GPP TSG RAN WG1 Meeting #96bis, R1-1904184, Apr. 12, 2019 (Apr. 12, 2019), 11 Pages, the whole document.

3GPP TS 38.214: 3rd Generation Partnership Project, Technical Specification Group Radio Access Network, NR, Physical layer procedures for data ( Release 16), 3GPP Standard, Technical Specification, 3rd Generation Partnership Project, Mobile Competence Centre 650, Route Des Lucioles, F-06921 Sophia-Antipolis Cedex, France, vol. RAN WG1, No. V16.1.0 Apr. 2020, 151 Pages, XP051893823, Section 6.1.2.3, p. 116-p. 119.

Huawei, et al., "Enhanced UL configured grant transmissions", R1-1901562, 3rd Generation Partnership Project, Mobile Competence Centre, 650, Route Des Lucioles, F-06921 Sophia-Antipolis Cedex, France, vol. RAN wG1, No. Athens, Greece, Feb. 25, 2019-Mar. 1, 2019, Feb. 16, 2019, 16 Pages, XP051599259, section 2.1, p. 1-p. 4.

Supplementary European Search Report—EP20935898—Search Authority—The Hague—Dec. 1, 2023.

Huawei, et al., "Enhanced UL Configured Grant Transmissions", 3GPP TSG RAN WG1 Meeting #96, R1-1901562, Athens, Greece, Feb. 25, 2019-Mar. 1, 2019, Feb. 16, 2019, 16 Pages.

* cited by examiner

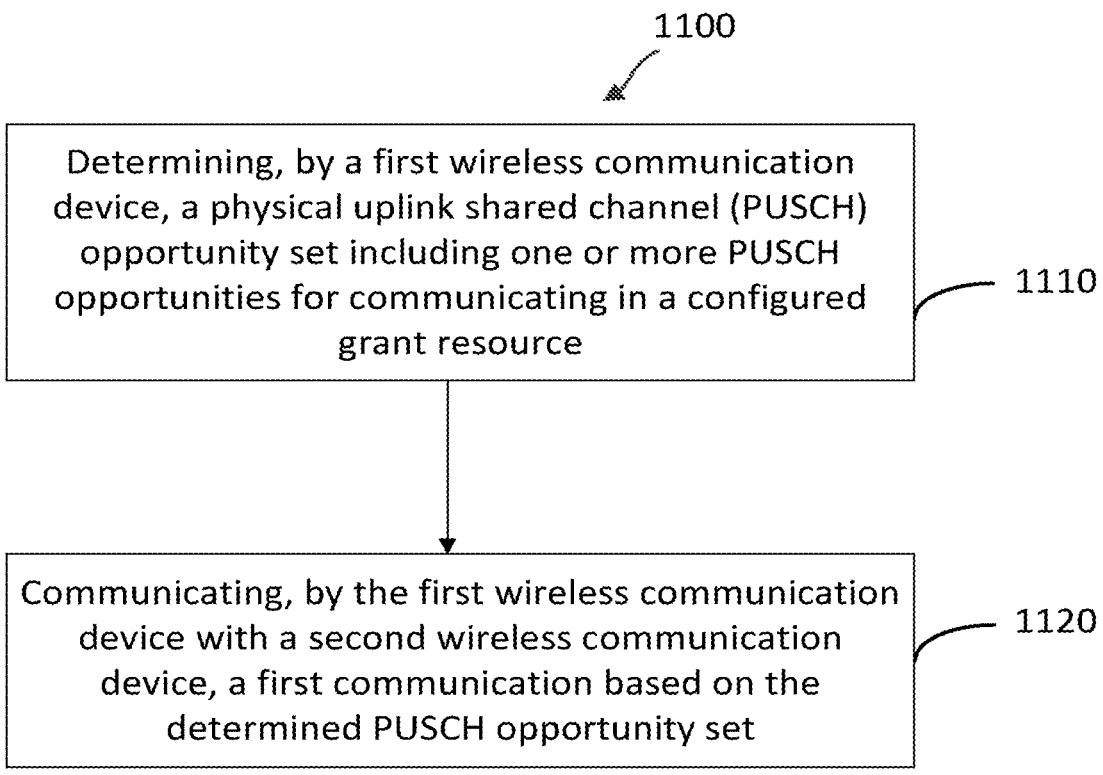

1100

Determining, by a first wireless communication device, a physical uplink shared channel (PUSCH) opportunity set including one or more PUSCH opportunities for communicating in a configured grant resource          — 1110

Communicating, by the first wireless communication device with a second wireless communication device, a first communication based on the determined PUSCH opportunity set          — 1120

FIG. 11

DITHERING JITTERED PERIODIC TRAFFIC FOR SINGLE UPLINK CONFIGURED GRANT

TECHNICAL FIELD

This application relates to wireless communication systems, including determining physical uplink shared channels for communicating in a configured grant resource.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHZ, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to providing a high-reliability communication is to apply HARQ techniques with an uplink configured grant (CG-UL) resource. For example, a UE may be configured with a CG-UL for transmitting an UL transmission to a BS. The BS may provide the UE with a reception status of the UL transmission. If the BS receives the UL transmission successfully, the BS may transmit a HARQ-acknowledgement (HARQ-ACK) to the UE. Conversely, if the BS fails to receive the UL transmission successfully, the BS may transmit a HARQ-negative-acknowledgement (HARQ-NACK) to the UE. Upon receiving a HARQ-NACK from the BS, the UE may retransmit the UL transmission. The UE may retransmit the UL transmission until a HARQ-ACK is received from the BS or reaching a certain retransmission limit.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes determining, by a first wireless communication device, a physical uplink shared channel (PUSCH) opportunity set including one or more PUSCH opportunities for communicating in a configured grant resource, and communicating, by the first wireless communication device with a second wireless communication device, a first communication based on the determined PUSCH opportunity set.

In an additional aspect of the disclosure, a first wireless communication device includes a processor configured to determine a physical uplink shared channel (PUSCH) opportunity set including one or more PUSCH opportunities for communicating in a configured grant resource, and a transceiver configured to communicate, with a second wireless communication device, a first communication based on the determined PUSCH opportunity set.

In an additional aspect of the disclosure, a non-transitory computer-readable medium having program code recorded thereon, the program code, when executed by a processor in a first wireless communication device, comprising code for causing the first wireless communication device to determine a physical uplink shared channel (PUSCH) opportunity set including one or more PUSCH opportunities for communicating in a configured grant resource, and communicate, with a second wireless communication device, a first communication based on the determined PUSCH opportunity set.

In an additional aspect of the disclosure, a first wireless communication device includes means for determining a physical uplink shared channel (PUSCH) opportunity set including one or more PUSCH opportunities for communicating in a configured grant resource, and means for communicating, with a second wireless communication device, a first communication based on the determined PUSCH opportunity set.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 11 is a flow diagram of a communication method according to some aspects of the present disclosure.

DETAILED DESCRIPTION

Figure 1:
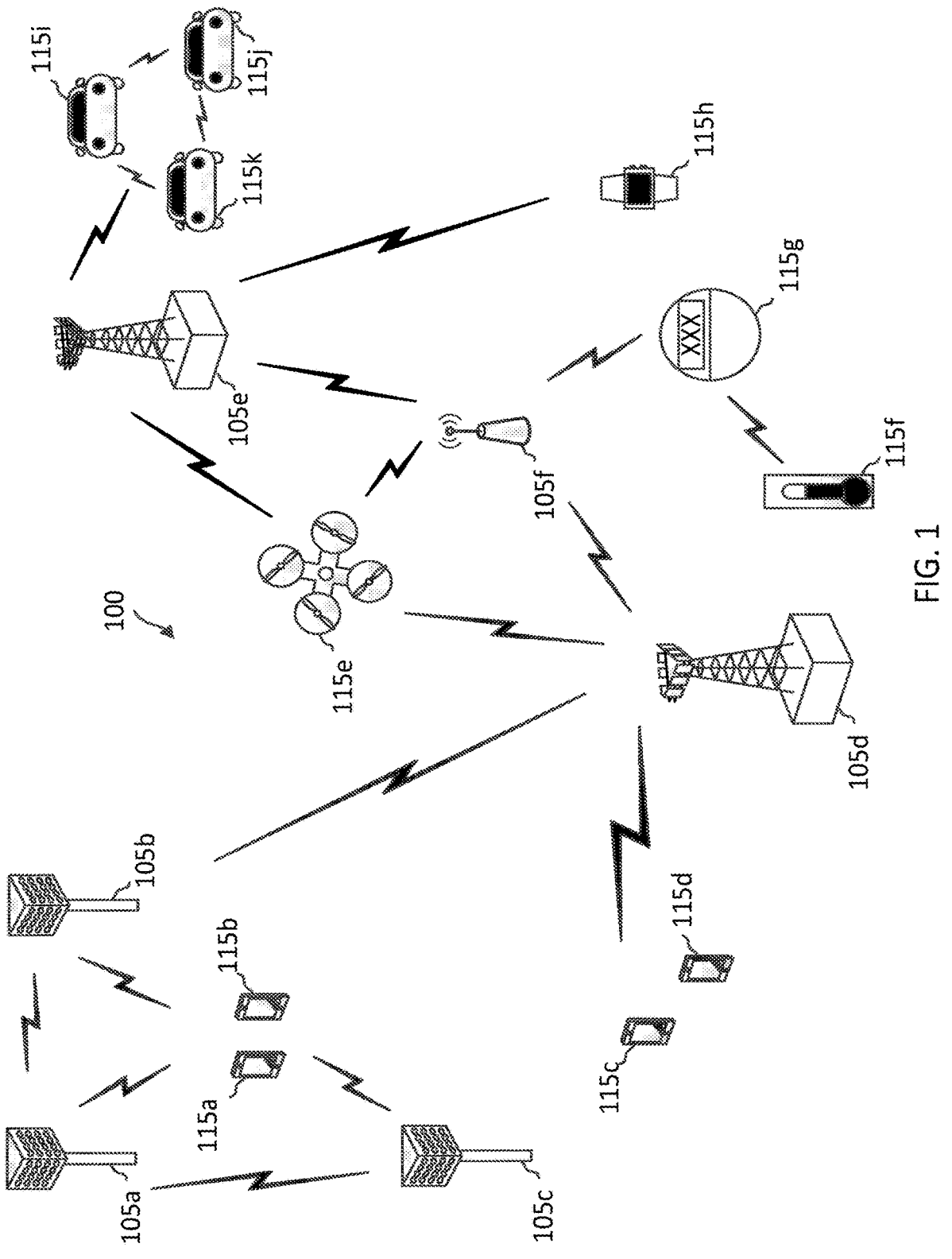
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a base station (BS) may configure a user equipment (UE) with a configured grant for autonomous transmission or non-scheduled transmission. Each configured grant is associated with a set of resources configured for the UE to transmit UL communications (e.g., data and/or control information) without being scheduled by the BS. The set of configured resource may occur periodically. The set of configured resources may correspond to transmission time occasions. In some instances, the UE may use the configured resources for transmitting a transport block (TB) on a physical uplink shared channel (PUSCH). To improve communication reliability, the UE may apply hybrid automatic repeat request (HARQ) techniques to the UL data transmission. Additionally, the UE may perform the UL data transmission with repetitions using different redundancy versions to improve decoding performance at the BS. When operating over a licensed band, the BS may assign a HARQ process and/or a HARQ redundancy version for transmission in each transmission time occasion. In other words, the BS may provide a mapping or association between HARQ process/redundancy version to configured resource in the time domain. The UE may transmit UL HARQ data in the configured transmission occasions based on the association.

The UE may transmit UL communications that arrive at the BS at timings are offset compared to the periodic configured grant resource. The uplink configured grant (CG-UL) may be associated with nominal arrival (NA) times, occurring with a period T, at which the UE's CG-UL transmissions should arrive at the BS according to the CG-UL configuration. The actual arrival (AA) times of the CG-UL transmissions may be different than the NA times (e.g., jitter). The UE may be configured with multiple CG-ULs to allow the UE to repeatedly transmit the CG-UL communications and increase the likelihood that the BS receives the communications. Multiple CG-ULs may, however, result in interference on other channels and require additional signaling overhead to configure separate HARQ processes for each CG-UL.

The present application describes mechanisms for determining PUSCH opportunities for communicating in a configured grant resource. For instance, a BS may provide a UE with a CG-UL including one or more PUSCH opportunities in which the UE may or may not transmit CG-UL communications to the BS. In some aspects, the BS and/or UE may determine a physical uplink shared channel (PUSCH) opportunity set including one or more PUSCH opportunities for communicating in a configured grant resource.

In some aspects, the PUSCH opportunity set includes one of a first set of contiguous time domain resource allocations (TDRAs) or a second set of non-contiguous TDRAs. In some aspects, the determined PUSCH opportunity set is associated with a HARQ process ID based on a first symbol of the configured grant resource. In some aspects, the BS and UE communicate a communication associated with a dynamic grant resource for retransmission based on the HARQ process ID.

In some aspects, the configured grant resource includes a repetition factor K, wherein K is an integer greater than or equal to one (1). In some aspects, a beginning of a first PUSCH opportunity is based on a first redundancy version (RV) identifier (RVID) being equal to zero (0). In some aspects, an ending of the first PUSCH opportunity is based on a second RVID being the next RVID equal to zero (0) after the first RVID in a RV sequence. In some aspects, a number of the determined PUSCH opportunities S is based on K.

In some aspects, the configured grant resource includes a number of slots N, each slot of the N number of slots including a number of PUSCHs M. In some aspects, a number of the determined PUSCH opportunities S is based on N*M. In some aspects, the configured grant resource includes a repetition factor K, wherein K is an integer greater than or equal to one (1), and the number of the determined PUSCH opportunities S is further based on N*M/K. In some aspects, a beginning of the first PUSCH opportunity is based on a first redundancy version (RV) identifier (RVID) being equal to zero (0), and an ending of the first PUSCH opportunity is based on a second RVID being the next RVID equal to zero (0) after the first RVID in a RV sequence. In some aspects, a spacing between the PUSCH opportunities of a set of non-contiguous TDRAs is based on an inter-opportunity interval T1. In some aspects, a number of the determined PUSCH opportunities S is based on an opportunity factor P indicating a number of PUSCHs of the configured grant resource associated with each opportunity.

Aspects of the present disclosure can provide several benefits. For instance, the present disclosure includes a CG-UL including one or more PUSCH opportunities in which the UE may or may not transmit CG-UL communications to the BS, which beneficially provides dithering to jittered periodic CG-UL communications. Additionally, configuring PUSCH opportunities in which the UE may only utilize one such opportunity for transmission beneficially avoids interference associated with repeatedly transmitting CG-UL communications (e.g., transmitting in all opportunities). Further, the present disclosure beneficially includes associating a single HARQ process with the PUSCH opportunities, which beneficially avoids the increased overhead associated with configuring multiple CG-ULs that are each associated with a different HARQ process. The present disclosure also includes configuring the PUSCH opportunities on non-contiguous time-domain resources, which beneficially increases flexibility in providing various CG-UL configurations. The present disclosure also includes configuring the PUSCH opportunities in different frequency domain allocations and beamforming configurations, which beneficially provides spectral and spatial diversity to CG-UL communications. The present disclosure therefore improves UE and network performance for CG-UL communications, beneficially providing higher data rates, higher capacity, better spectral efficiency, and increased reliability.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, May also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may provide to UE 115 (or, e.g., UE 215 of FIG. 2 or UE 500 of FIG. 5) a configured grant resource. In some aspects, a BS 105 (or, e.g., BS 205 of FIG. 2 or BS 600 of FIG. 6) may also communicate to the UE 115 parameters regarding the configured grant resource, such as the number of PUSCHs per slot and the number of slots in a configured grant resource period. In some aspects, the network 100 may configure a HARQ process associated with the CG-UL. In some aspects, the UE 115 may communicate to the BS 105, via network 100, communications using an uplink configured grant (CG-UL) resource.

Figure 2:
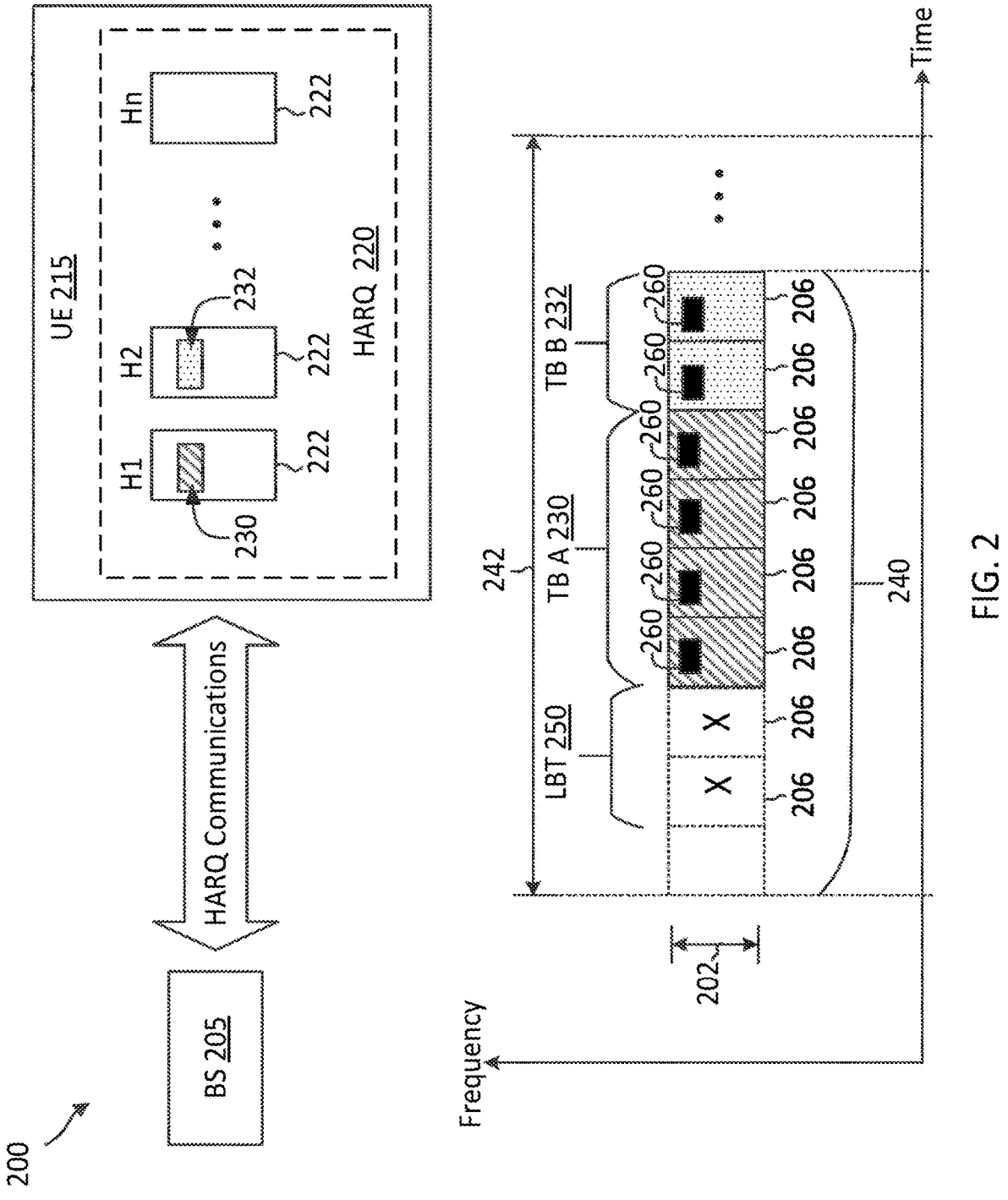
FIG. 2 illustrates a hybrid automatic repeat request (HARQ) communication scenario according to some aspects of the present disclosure.

FIG. 2 illustrates a hybrid automatic repeat request (HARQ) communication scenario according to some aspects of the present disclosure. The scenario 200 may correspond to a HARQ communication scenario in the network 100 when the network 100 operates over a shared frequency band or an unlicensed frequency band. In FIG. 2, the x-axis represents time in some constant units. In the scenario 200, a BS 205 similar to the BSs 105 may communicate data with a UE 215 similar to the UEs 115 using HARQ over a frequency band 202, which may be a licensed frequency band or a shared radio frequency band in a shared spectrum or an unlicensed spectrum, shared by multiple network operating entities. The frequency band 202 may be located at any suitable frequencies. In some aspects, the frequency band 202 may be located at about 3.5 GHZ, 6 GHZ, or 30 GHz.

For HARQ communications, a transmitting node (e.g., the UE 215) may transmit data (e.g., in the form of a TB) to a receiving node (e.g., the BS 205). The receiving node may provide the transmitting node with a feedback on the reception status of the data. For example, the receiving node may transmit an ACK to the transmitting node to indicate a successful decoding of the data. Conversely, the receiving node may transmit a NACK to the transmitting node to indicate a decoding failure for the data. When the transmitting node receives an ACK from the receiving node, the transmitting node may transmit new data in a subsequent transmission. However, when the transmitting node receives a NACK from the receiving node, the transmitting node may retransmit the same data to the receiving node. In some instances, the transmitting node may use the same encoding version for the initial transmission and the retransmission. In some other instances, the transmitting node may use different encoding versions for the initial transmission and the retransmission. The encoding versions may be referred to as redundancy versions. Different redundancy versions may include different combinations of systematic data information bits and error correction bit. In some aspects, the receiving node may perform soft-combining to decode the data based on the initial transmission and the retransmission. For simplicity of discussion and illustration, FIG. 2 illustrates the HARQ communication in the context of UL data communications, though similar HARQ mechanisms may be applied to DL data communications.

As an example, the UE 215 includes a HARQ component 220. The HARQ component 220 is configured to perform multiple parallel HARQ processes 222 for UL data communications. The HARQ processes 222 may operate independent of each other. In other words, the ACKs, NACKs, and/or retransmissions are determined and processed separately for each HARQ process 222 at the BS 205 and at the UE 215. Each HARQ process 222 may be identified by a HARQ process identifier (ID). For example, the HARQ processes 222 may be identified by identifiers H1, H2, . . . Hn. Each HARQ process 222 may have one or more TBs ready for transmission. In the illustrated example of FIG. 2, the HARQ process H1 222 has one TB 230 ready for transmission and the HARQ process H2 222 has one TB 232 ready for transmission. The BS 205 may configure the UE 215 with configured resources for autonomous or unscheduled transmission. The UE 215 may transmit the TB 230 and the TB 232 to the BS 205 using a configured resource.

In some aspects, the BS 205 may configure the UE 215 with a configured resource 240. The configured resource 240 may be periodic. For instance, the configured resource 240 may repeated at a time interval 242. The configured resource 240 may be partitioned into a plurality transmission time periods or slots 206. Each slot 206 may include any suitable number of OFDM symbols depending on the transmission configurations or numerology (e.g., the subcarrier spacing (SCS) and/or the cyclic prefix (CP) mode) in use.

The UE 215 may perform an LBT 250 in the frequency band 202 prior to a transmission. As an example, a first LBT 250 attempt for a transmission in a second slot 206 within the configured resource 240 failed (shown by the cross symbol). A second LBT 250 attempt for a transmission in a third slot 206 within the configured resource 240 also failed (shown by the cross symbol). A third LBT attempt for a transmission in a fourth slot 206 within the configured resource 240 is a pass. Thus, the UE 215 may initiate a transmission beginning at the fourth slot 206. Once the UE 215 won a contention (e.g., passing the LBT 250), the UE 215 may use the configured resource for a number of consecutive HARQ transmissions.

In the illustrated example of FIG. 2, after passing the LBT 250, the UE 215 transmits four repetitions of the TB 230, denoted as TB A, followed by two repetitions of the TB 232, denoted as TB B, in consecutive slots 206. In some aspects, the UE 215 may transmit the repetitions for the TB 230 using different redundancy versions and/or the same redundancy versions. In some instances, each repetition may use a different RVN. In some instances, all repetitions may use the same RVN. In some instances, at least two repetitions may use the same RVN. Similarly, the UE 215 may transmit the repetitions for the TB 232 using different redundancy versions and/or the same redundancy versions. In some aspects, the UE 215 may include a RVN and/or a HARQ ID for each transmission, for example, in uplink control information (UCI) 260. For instance, the RVN may indicate a RV0, a RV1, a RV2, a RV3, a RV4, and so on. Each transmission for the TB A 230 may include UCI 260 indicating a HARQ ID H1. Similarly, each transmission for the TB B 232 may include UCI 260 indicating a HARQ ID H2. The UE 215 may further indicate whether a transmission is an initial transmission or a retransmission by including a new data indicator (NDI) in the UCI 260. For example, the NDI may be set to a value of 1 to indicate that a corresponding transmission is an initial transmission and may be set to a value of 0 to indicate that a corresponding transmission is a retransmission. For instance, the UCI 260 for each transmission of the TB A 230 may include a NDI with a value of 1 to indicate that the repetitions of the TB A 230 are associated with an in initial transmissions of the TB A 230. The UCI 260 for each transmission of the TB B 232 may include a NDI with a value of 0 to indicate that the repetitions of the TB B 232 are associated with a retransmission of the TB B 232. In some aspects, the UE 215 may determine a RV sequence (e.g., a sequence of RVNs) for transmitting one or more redundancy versions of a TB in a configured resource and/or how to prioritize transmission of one TB of a certain HARQ process 222 over another TB of another HARQ process 222 without assistance from the BS 205. In some other instances, the BS 205 may provide the UE with some assistance in the RV sequence determination and/or HARQ ID selection.

Figure 3:
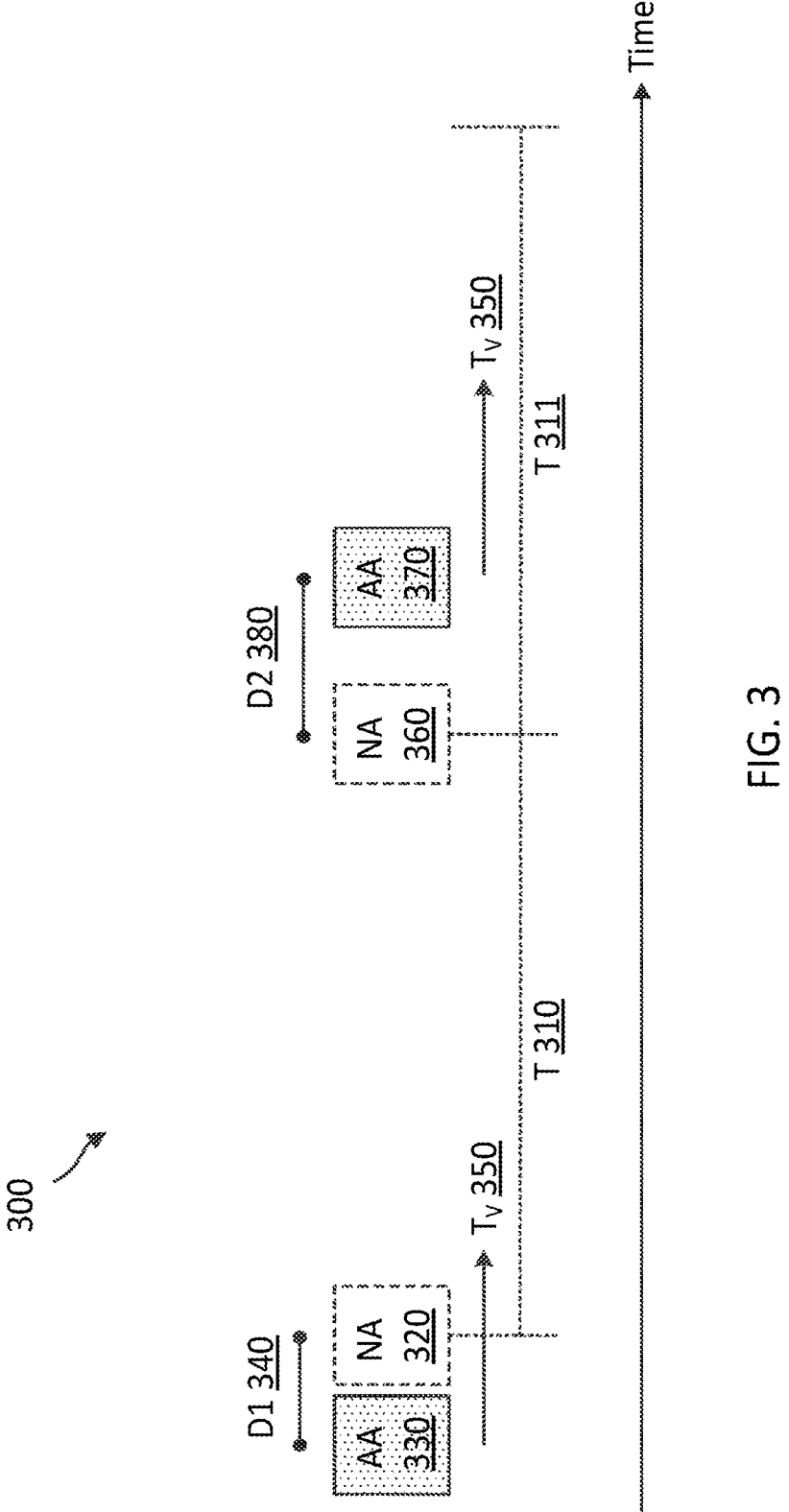
FIG. 3 illustrates an uplink transmission scheme according to some aspects of the present disclosure.

FIG. 3 illustrates an uplink transmission scheme according to some aspects of the present disclosure according to some aspects of the present disclosure. The functionality of scheme 300 can be executed by a computing device (e.g., a processor, processing circuit, and/or other suitable component) of a wireless communication device or other suitable means. In some aspects, a wireless communication device such as the UE 115, UE 215, or UE 500 may utilize one or more components, such as the processor 502, the memory 404, the CG module 508, the transceiver 510, the modem 512, and the one or more antennas 516, to execute the steps of scheme 300. Further, a wireless communication device such as the base station (BS) 105, BS 205, or BS 600 may utilize one or more components, such as the processor 602, the memory 604, the CG module 608, the transceiver 610, the modem 612, and the one or more antennas 616, to execute the steps of scheme 300. The scheme 300 may employ similar mechanisms as described in FIGS. 1-2 and 4-11. In FIG. 3, the x-axis represents time in some arbitrary units.

As illustrated in FIG. 3, uplink transmissions may be associated with nominal arrival (NA) times, occurring with a period T, at which the UE's CG-UL transmissions should arrive at the BS according to the CG-UL configuration. For instance, in the period T 310, an uplink transmission may be associated with NA 320. The actual arrival (AA) time AA 330 of a transmission at the BS may be different than NA 320 by an offset or time difference D1 340. In some aspects, each uplink transmission may be associated with a valid interval Tv 350 in which the transmission is to be received in order to provide low latency (e.g., internet of things applications). In some aspects, Tv is less than or significantly less than T (e.g., Tv<<T). In the next period T 320, a subsequent periodic uplink transmission may be associated with NA 360 that is offset from AA 370 by D2 380, where D1 may be different in sign and magnitude than D2.

Figure 4A:
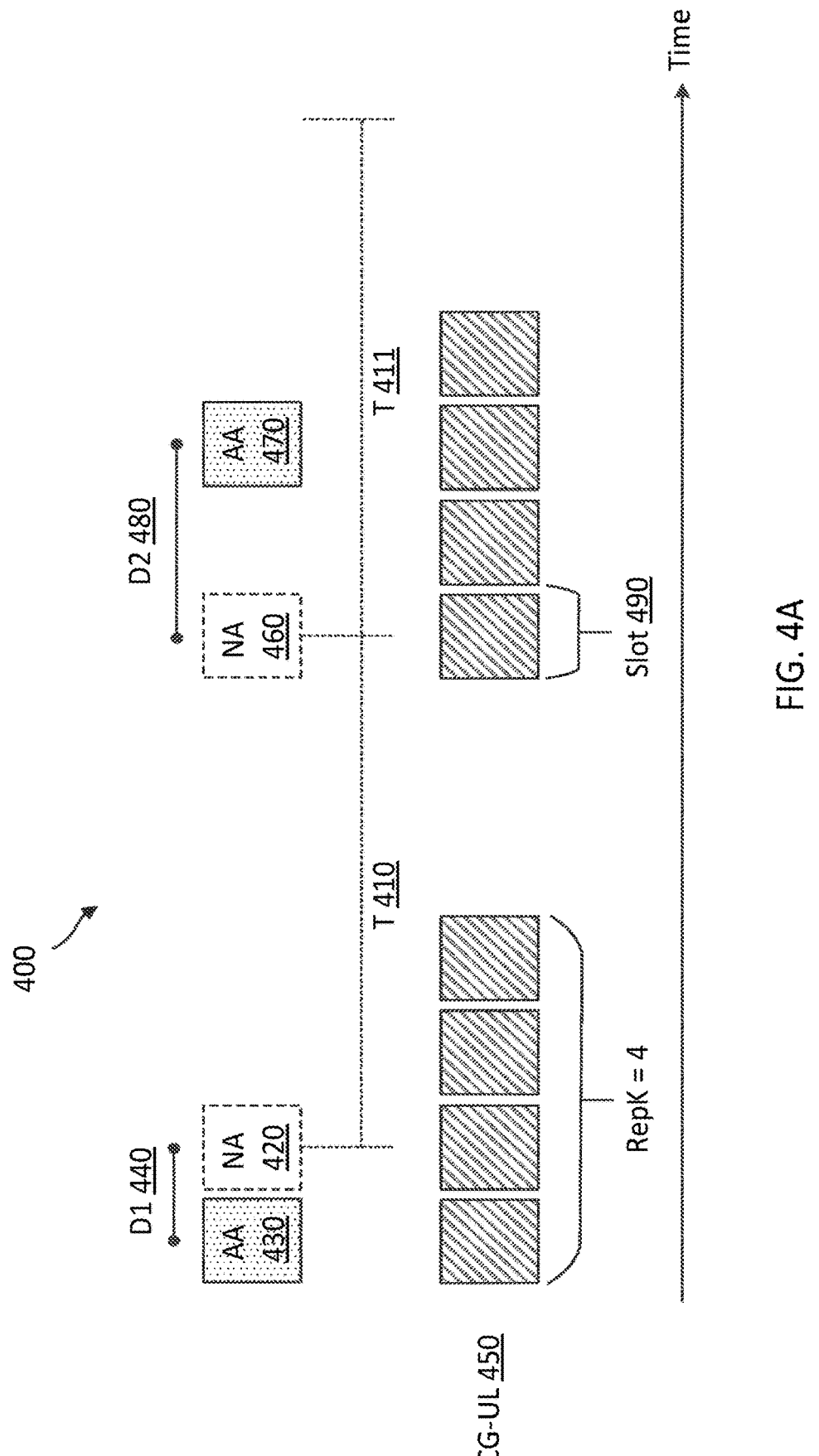
FIGS. 4A-4C illustrate uplink transmission schemes using configured grant resources according to some aspects of the present disclosure.
Figure 4B:
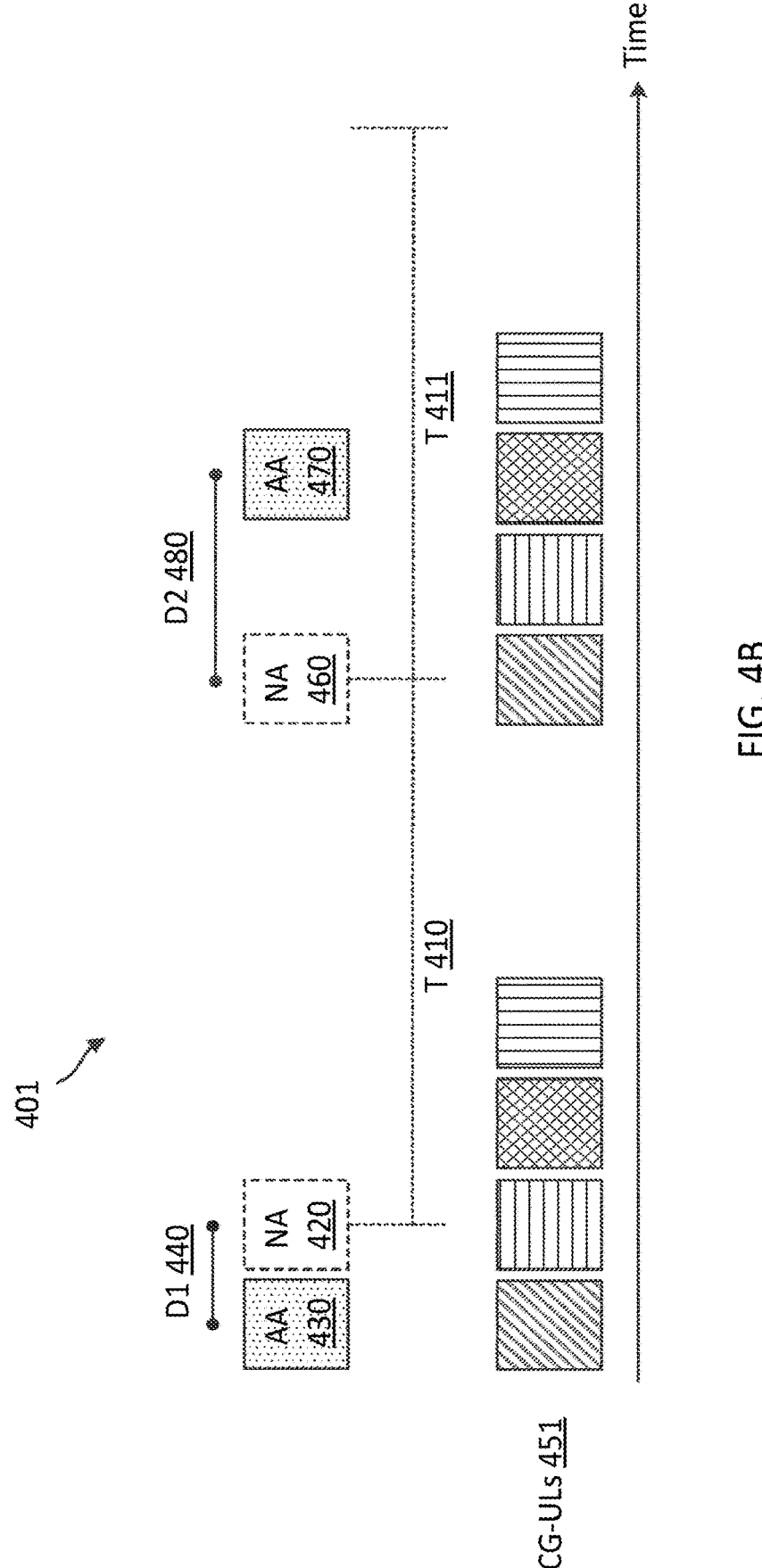
Figure 4C:
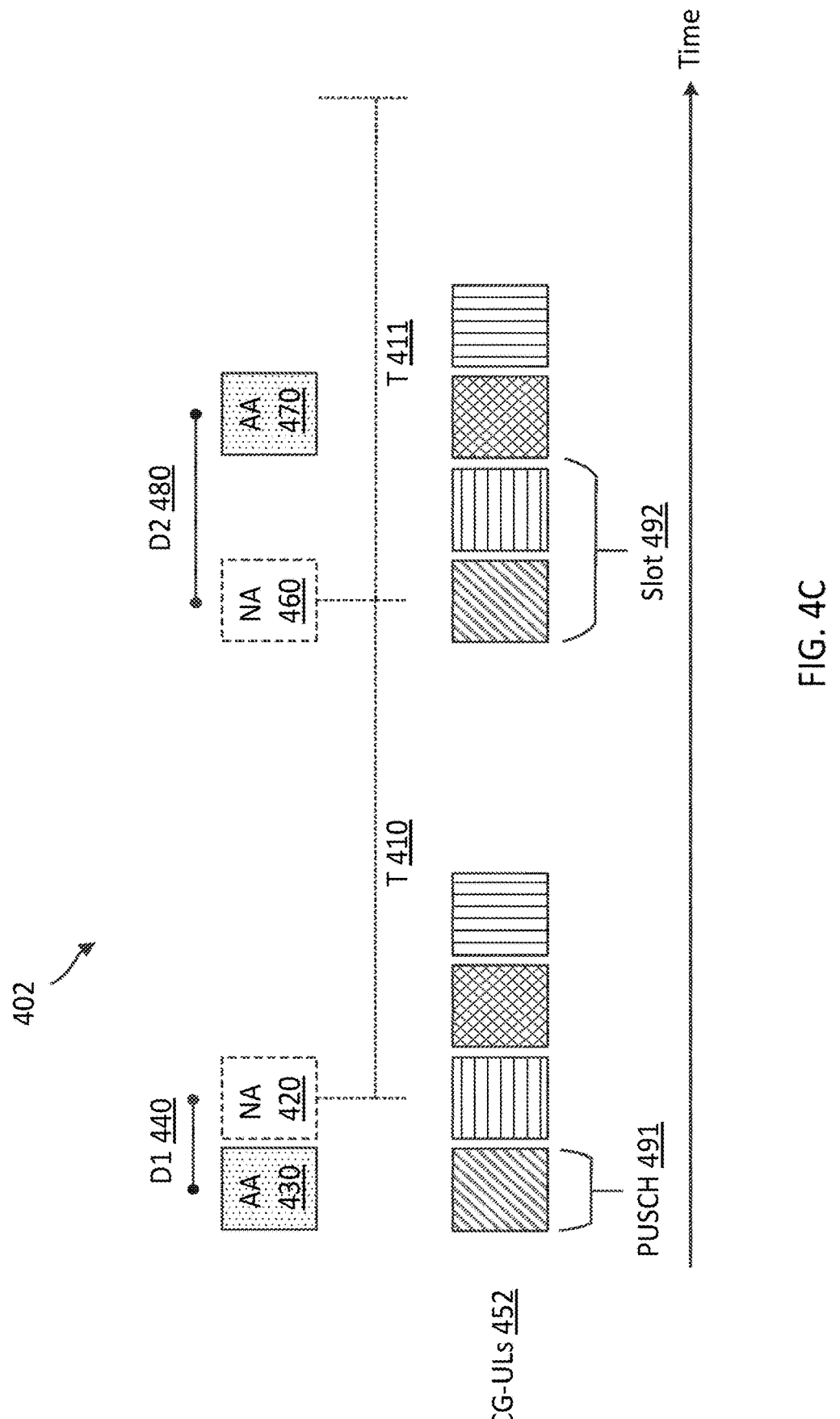

FIGS. 4A-4C illustrate uplink transmission schemes using configured grant resources according to some aspects of the present disclosure. The functionality of schemes 400 to 402 can be executed by a computing device (e.g., a processor, processing circuit, and/or other suitable component) of a wireless communication device or other suitable means. In some aspects, a wireless communication device such as the UE 115, UE 215, or UE 500 may utilize one or more components, such as the processor 502, the memory 404, the CG module 508, the transceiver 510, the modem 512, and the one or more antennas 516, to execute the steps of schemes 400 to 402. Further, a wireless communication device such as the base station (BS) 105, BS 205, or BS 600 may utilize one or more components, such as the processor 602, the memory 604, the CG module 608, the transceiver 610, the modem 612, and the one or more antennas 616, to execute the steps of schemes 400 to 402. The schemes 400 to 402 may employ similar mechanisms as described in FIGS. 1-3 and 5-11. In FIGS. 4A-4C, the x-axis represents time in some arbitrary units.

As illustrated in FIG. 4A, periodic uplink transmissions associated with an uplink configured grant resource CG-UL 450 may be associated with nominal transmission arrival (NA) times and actual transmission arrival (AA) times at a BS. For instance, in a period T 410, NA 420 may be associated with AA 430, which is offset by D1 440. In a period T 411, NA 460 may be associated with AA 470, which is offset by D2 480.

As further illustrated in FIG. 4A, to increase the likelihood that the BS will receive a CG-UL communication from a UE in a scenario including arrival time offsets such as D1 440 and D2 480, in some aspects CG-UL 450 may be configured with a repetition factor (RepK). In some aspects, a repetition factor K is an integer greater or equal to 1. For instance, CG-UL 450 may be configured with RepK=4 such that the UE repeatedly transmits a CG-UL communication four times in each period T 410 and T 411. In some aspects, the UE may start its first of its repeated transmissions in advance such that the BS may receive the communication in T 410 prior to NA 420 and/or receive the communication in T 411 prior to NA 460 (e.g., opportunistic early decoding). However, the repeated transmissions may cause increased interference in other channels or frequency bands (e.g., co-channel or adjacent channels), which may cause a network to employ a more conservative allocation of power and/or time-frequency resources. In some aspects, a repetition factor configuration includes the UE repeating the transmission in each subsequent slot 490. However, the offsets or time differences D1 440 and D2 480 and Tv 350 may be smaller than a slot. For instance, D1 440 and D2 480 and Tv 350 on the scale of a symbol.

As illustrated in FIG. 4B, the UE may be configured with multiple configured grants (CGs) in a period CG-ULs 451. For instance, the UE may be configured with CG-ULs 451 that includes four CGs per period T (410, 420). In some aspects, CG-UL 451 may include four PUSCHs associated with period T 410 and four PUSCHs associated with period T 411. For instance, as illustrated in FIG. 4B, each of the different patterns for the four PUSCHs associated with periods T 410 and T 411 (i.e., the diagonal, horizontal, vertical, or cross-hatched lines) may be associated with a different CG. However, a separate HARQ process may be configured for each of the multiple CG-ULs 451, which increases signaling overhead associated with configuring, activating, and reactivating each HARQ process separately.

As illustrated in FIG. 4C, the UE may be configured with multiple configured grants CG-ULs 452. In some aspects, CG-ULs 452 may include multiple PUSCHs 491 within a slot 492 and multiple slots 492 within a period T410 or T 411. In some aspects, CG-ULs 452 may include a number N of slots 492, each slot of the N number of slots including a number M of PUSCHs 491. In some aspects, each PUSCH 491 of CG-ULs 452 may be associated with a different HARQ process. In some aspects, the UE communicates rich-context uplink control information (UCI) in each PUSCH so that the HARQ processes may be dynamically utilized to, for example, configure retransmissions over the resources of CG-ULs 452. In some aspects, the rich-context UCI may require more network resources than non-rich-context UCI using a static, timing-based HARQ formula and dynamic-grant-based retransmissions.

Accordingly, the present disclosure provides techniques for determining a physical uplink shared channel (PUSCH) opportunity set including one or more PUSCH opportunities for communicating in a configured grant resource. The present disclosure further provides PUSCH opportunities in non-contiguous time-domain resources, different frequency-domain resources, and/or different beamforming configurations. In some aspects, the present disclosure includes configuring one HARQ process per configured grant uplink (CG-UL) resource, there is a one-to-one mapping between a CG-UL and a HARQ process, and the UE sends a transmission using only one of the PUSCH opportunities in the CG-UL.

Figure 5:
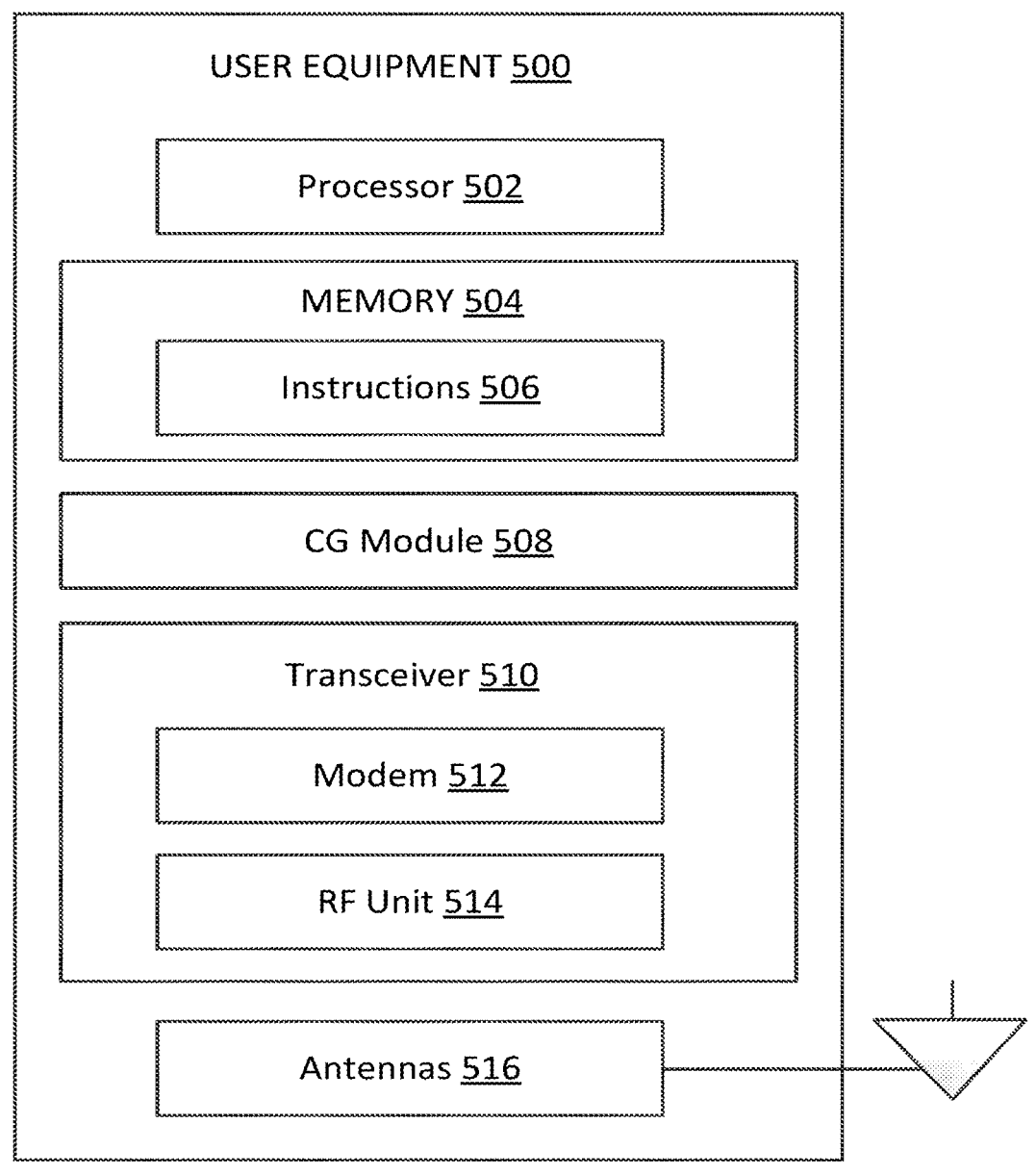
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1 or a UE 215 discussed above in FIG. 2. As shown, the UE 500 may include a processor 502, a memory 504, a CG module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 3-4 and 7-11. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The CG module 508 may be implemented via hardware, software, or combinations thereof. For example, CG module 508 may be implemented as a processor, circuit, and/or instructions 506 stored in the memory 504 and executed by the processor 502. In some examples, the CG module 508 can be integrated within the modem subsystem 512. For example, the CG module 508 can be implemented by a combination of software components (e.g., executed by a DSP or a general processor) and hardware components (e.g., logic gates and circuitry) within the modem subsystem 512. In some examples, a UE may include one or more CG module 508.

The CG module 508 may be used for various aspects of the present disclosure, for example, aspects of FIGS. 3-4 and 7-11. In some aspects, the CG module 508 can be configured to determine a PUSCH opportunity set including one or more PUSCH opportunities for communicating in a configured grant resource. In some aspects, the CG module 508 can be configured to communicate, with a BS, a communication based on the determined PUSCH opportunity set.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the configured transmission module 507 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., configured UL transmissions, dynamic grant UL transmissions, PUSCH, PUCCH, PRACH, SRS, DMRS) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., PDCCH, PDSCH, DCI, CORESETs, RRC messages, time domain resource allocation (TDRA) tables, frequency domain resource allocation (FDRA) tables, beamforming configurations, downlink reference signals, CG-PUSCH information, bitmaps, other system and channel parameters) to the configured transmission module 507 for processing. The antennas 516 may include multiple antennas of similar or different designs in order to sustain multiple transmission links. The RF unit 514 may configure the antennas 516.

In an example, the transceiver 510 is configured to receive, from a base station (BS), information or parameters regarding a configured grant resource or a dynamic grant resource, and communicate, with the BS, PUSCHs and HARQ-ACKs associated with PUSCH opportunities, HARQ processes, and HARQ process IDs, for example, by coordinating with the CG module 508.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
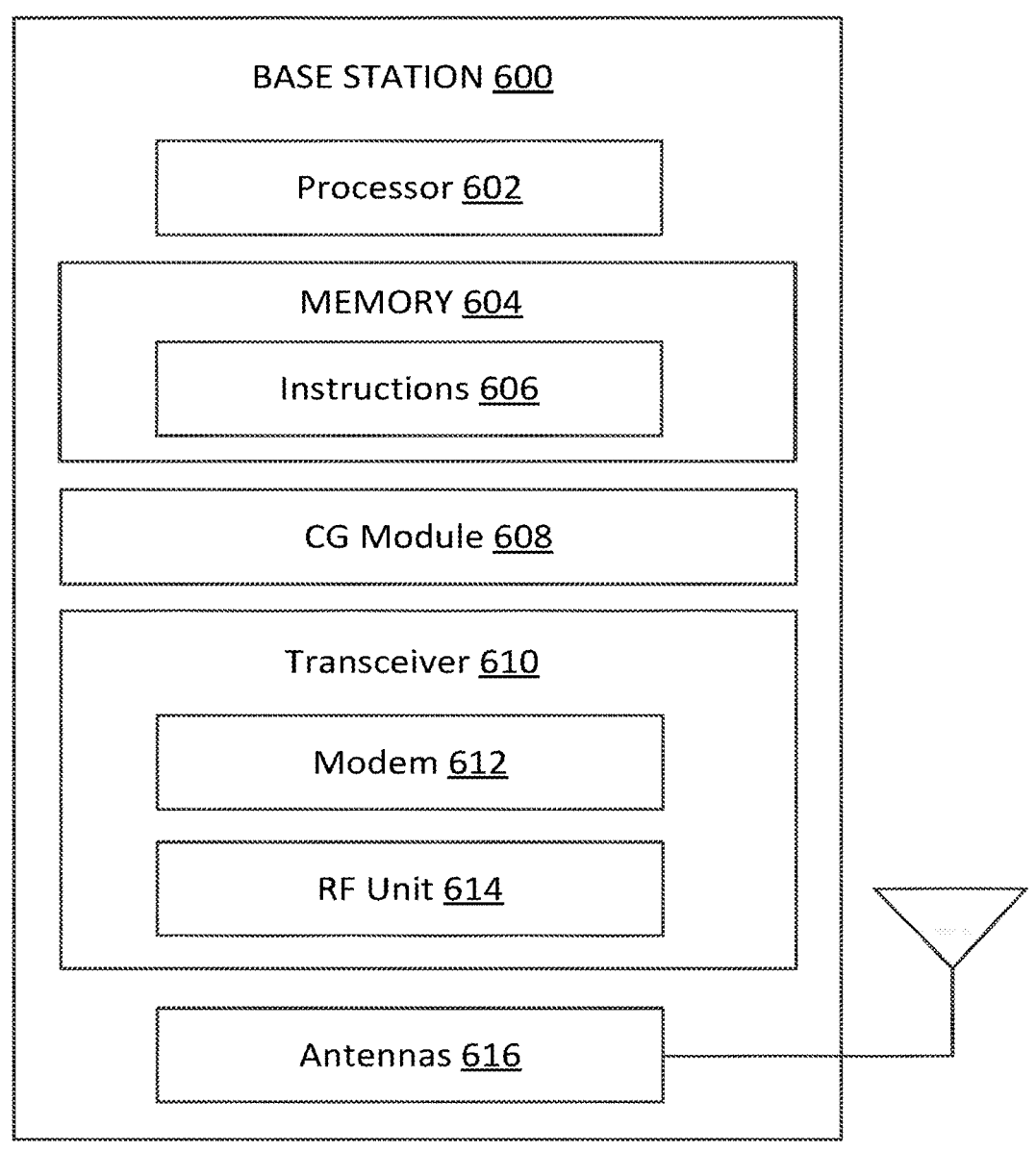
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. A shown, the BS 600 may include a processor 602, a memory 604, CG module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 3-4 and 7-11. Instructions 606 may also be referred to as code, which may be interpreted broadly to include any type of computer-readable statement(s) as discussed above with respect to FIG. 5.

The CG module 608 may be implemented via hardware, software, or combinations thereof. For example, the CG module 608 may be implemented as a processor, circuit, and/or instructions 606 stored in the memory 604 and executed by the processor 602. In some examples, the CG module 608 can be integrated within the modem subsystem 612. For example, the CG module 608 can be implemented by a combination of software components (e.g., executed by a DSP or a general processor) and hardware components (e.g., logic gates and circuitry) within the modem subsystem 612. In some examples, a UE may include one or more CG module 608.

The CG module 608 may be used for various aspects of the present disclosure, for example, aspects of FIGS. 3-4 and 7-11. In some aspects, the CG module 608 can be configured to determine a PUSCH opportunity set including one or more PUSCH opportunities for communicating in a configured grant resource. In some aspects, the CG module 608 can be configured to communicate, with a BS, a communication based on the determined PUSCH opportunity set.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PDCCH, PDSCH, DCI, CORESETs, RRC messages, time domain resource allocation (TDRA) tables, frequency domain resource allocation (FDRA) tables, beamforming configurations, downlink reference signals, CG-PUSCH information, bitmaps, other system and channel parameters) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem

612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., configured UL transmissions, dynamic grant UL transmissions, PUSCH, PUCCH, PRACH, SRS, DMRS) to the communication module 608 and configured transmission module 608 for processing. The antennas 616 may include multiple antennas of similar or different designs in order to sustain multiple transmission links.

In an example, the transceiver 610 is configured to transmit, to a UE, information or parameters regarding a configured grant resource and/or dynamic grant resource, and communicate, with the UE, PUSCHs and HARQ-ACKs associated with PUSCH opportunities, HARQ processes, and HARQ process IDs, for example, by coordinating with the CG module 608.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

FIGS. 7A-7F illustrate uplink transmission schemes using configured grant resources according to some aspects of the present disclosure. The functionality of schemes 700 to 705 can be executed by a computing device (e.g., a processor, processing circuit, and/or other suitable component) of a wireless communication device or other suitable means. In some aspects, a wireless communication device such as the UE 115, UE 215, or UE 500 may utilize one or more components, such as the processor 502, the memory 404, the CG module 508, the transceiver 510, the modem 512, and the one or more antennas 516, to execute the steps of schemes 700 to 705. Further, a wireless communication device such as the base station (BS) 105, BS 205, or BS 600 may utilize one or more components, such as the processor 602, the memory 604, the CG module 608, the transceiver 610, the modem 612, and the one or more antennas 616, to execute the steps of schemes 700 to 705. The schemes 700 to 705 may employ similar mechanisms as described in FIGS. 1-6 and 8-11. In FIGS. 7A-7F, the x-axis represents time in some arbitrary units.

Figure 7A:
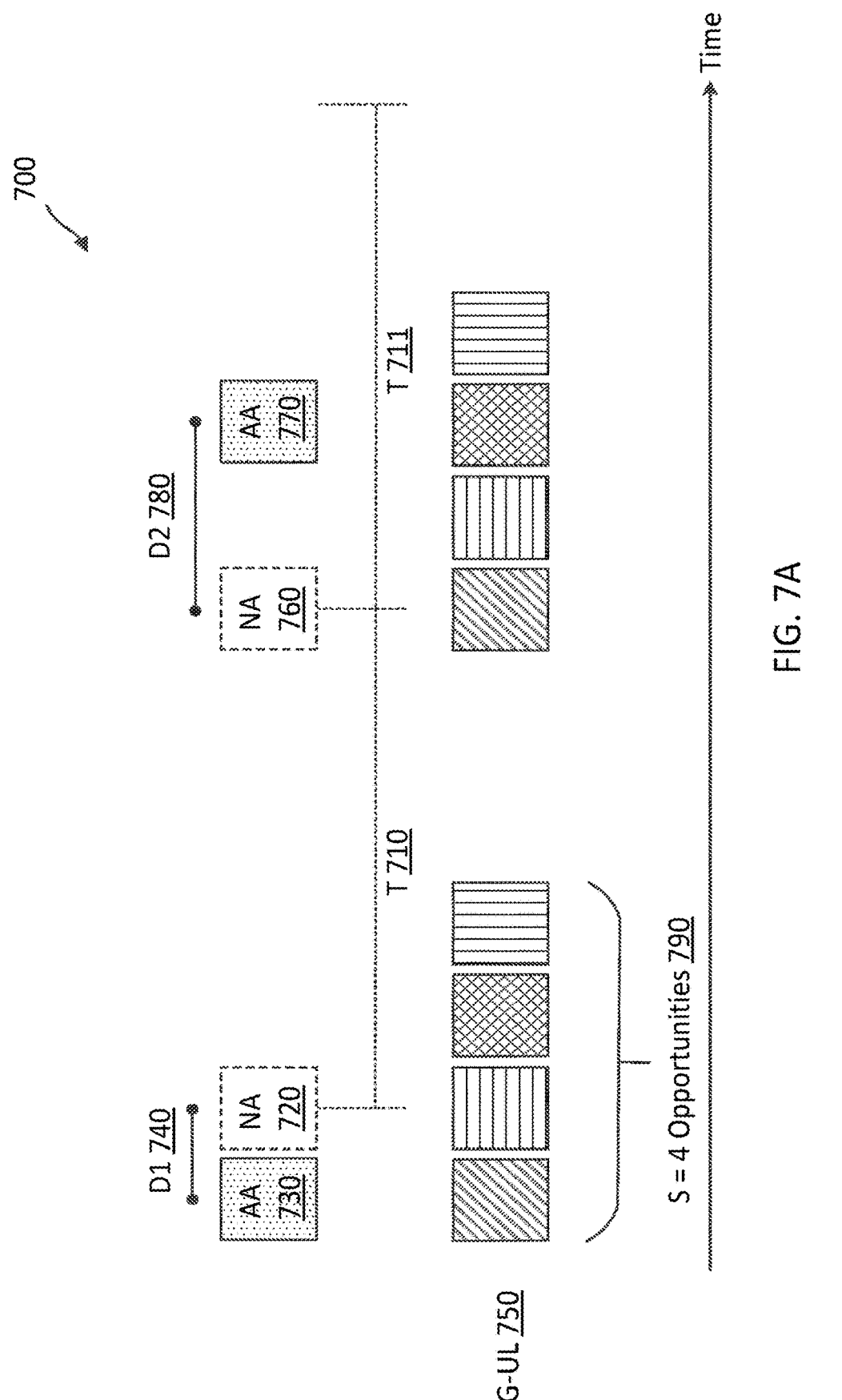
FIGS. 7A-7F illustrate uplink transmission schemes using configured grant resources according to some aspects of the present disclosure.

As illustrated in FIG. 7A, periodic uplink transmissions associated with an uplink configured grant resource CG-UL 750 may be associated with nominal transmission arrival (NA) times and actual transmission arrival (AA) times at a BS. For instance, in a period T 710, NA 720 may be associated with AA 730, which is offset by D1 740. In a period T 711, NA 760 may be associated with AA 770, which is offset by D2 780. In some aspects, the PUSCH opportunities of CG-UL 750 may be configured via radio resource control (RRC).

In some aspects, a number S of PUSCH opportunities 790 of CG-UL 750 may be configured in each of periods T 710 and T 720. In some aspects, a number S of PUSCH opportunities 790 may be S=4 PUSCH opportunities. As illustrated in FIG. 7A, each of the different patterns (i.e., the diagonal, horizontal, vertical, or cross-hatched lines) for the four PUSCHs of CG-UL 750 associated with period T 710 (or T 711) may be associated with a different PUSCH opportunity. In some aspects, one HARQ process is configured for all of the PUSCH opportunities of CG-UL 750. In some aspects, there is a one-to-one mapping between CG-UL 750 and a HARQ process. In some aspects, the mapping between CG-UL 750 and a HARQ process is based on the timing of the first symbol of CG-UL 750. In some aspects, the UE sends a transmission using only one of the PUSCH opportunities of CG-UL 750. In some aspects, the UE sends a transmission using one of the PUSCH opportunities of CG-UL 750 comprising non-context-rich UCI. In some aspects, the network configures one or more dynamic grants for PUSCH retransmission where the transport block being retransmitted is determined based on the HARQ process ID.

Figure 7B:
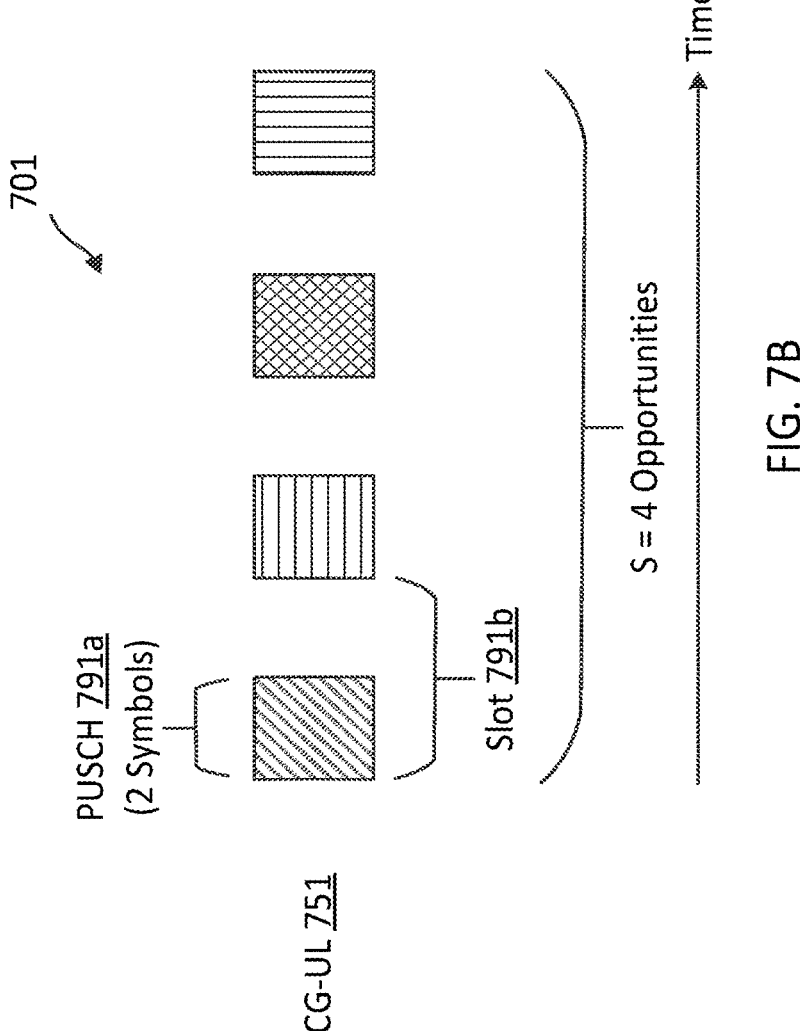

As illustrated in FIG. 7B, CG-UL 751 may include a set of PUSCH opportunities configured in non-contiguous time domain resource allocations (TDRAs). In some aspects, a PUSCH 791*a* may comprise multiple OFDM symbols such as two symbols. In some aspects, each PUSCH 791*a* is configured in a different slot 791*b*. In some aspects, CG-UL 751 may include a set of S=4 PUSCH opportunities. In some aspects, the number S PUSCH opportunities of CG-UL 751 may be determined according to the schemes of FIGS. 8A-8C as discussed below. In some aspects, the PUSCH opportunities of CG-UL 751 may be configured with a PUSCH repetition type A associated with a relatively (compared to type B) increased time spacing or gap between repetitions.

Figure 7C:
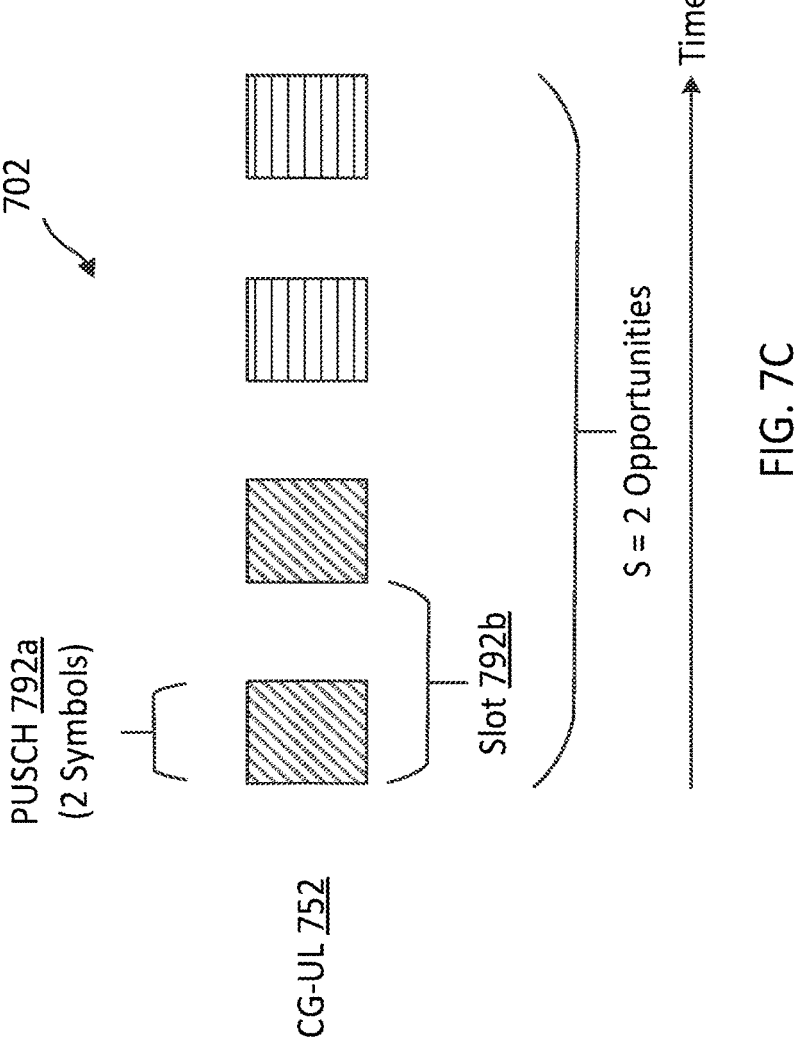

As illustrated in FIG. 7C, CG-UL 752 may include a set of PUSCH opportunities configured in non-contiguous TDRAs. In some aspects, a PUSCH 792*a* may comprise multiple OFDM symbols such as two symbols. In some aspects, each PUSCH 792*a* of CG-UL 752 is configured in a different slot 792*b*. In some aspects, CG-UL 752 may include a set of S=2 PUSCH opportunities, where the first two PUSCHs 792*a* of CG-UL 752 (indicated by diagonal pattern lines) are associated with a first PUSCH opportunity and the second two PUSCHs 792*a* of CG-UL 752 (indicated by horizontal pattern lines) are associated with a second PUSCH opportunity. In some aspects, the number S PUSCH opportunities of CG-UL 752 may be determined according to the schemes of FIGS. 8A-8C as discussed below. In some aspects, the PUSCH opportunities of CG-UL 752 may be configured with a PUSCH repetition type A.

Figure 7E:
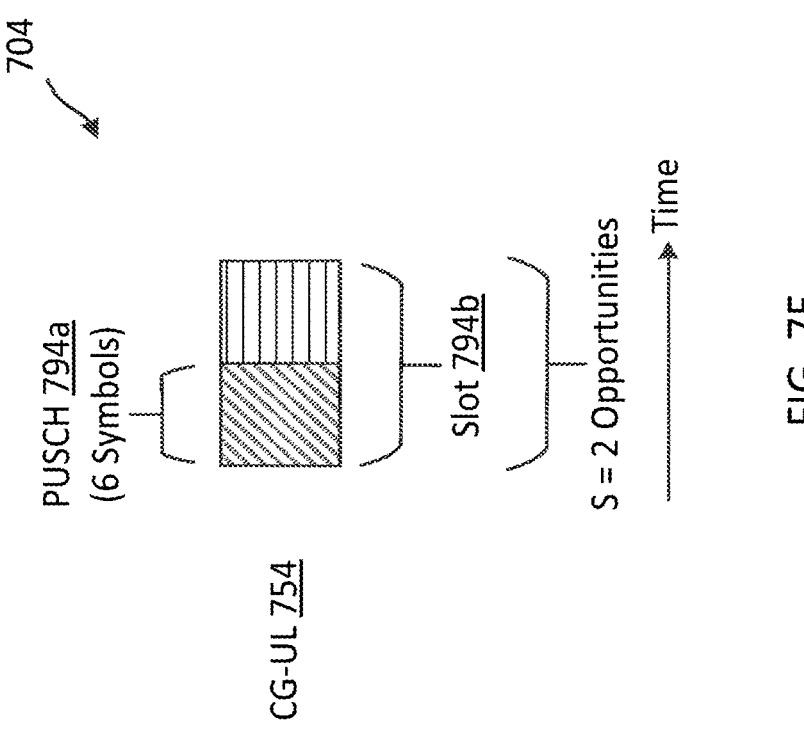
Figure 7D:
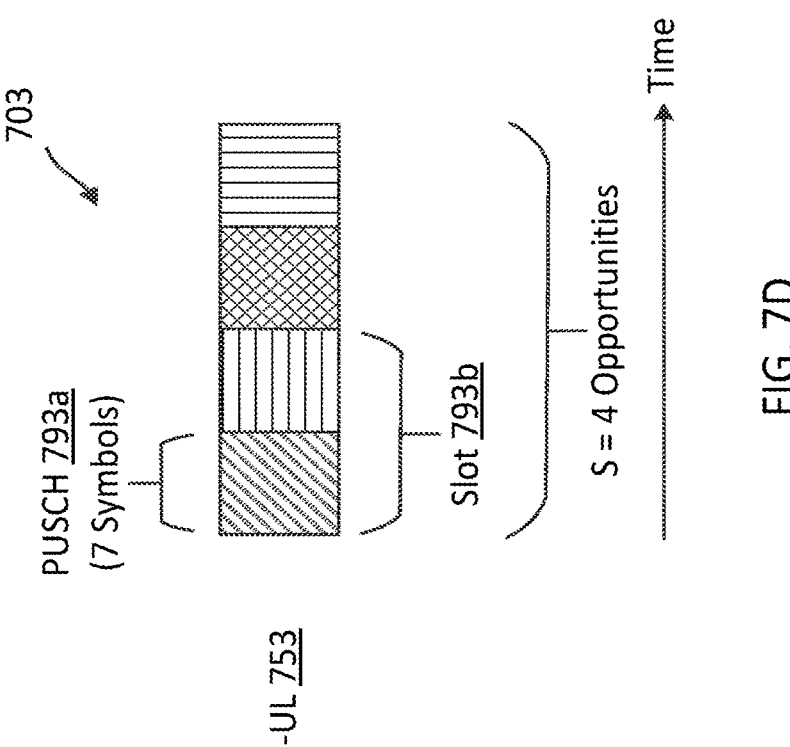

As illustrated in FIG. 7D, CG-UL 753 may include a set of PUSCH opportunities configured in contiguous TDRAs. In some aspects, a PUSCH 793*a* may comprise multiple OFDM symbols such as seven symbols. In some aspects, multiple PUSCHs 793*a* are configured in a single slot 793*b*. In some aspects, CG-UL 753 may include a set of S=4 PUSCH opportunities. In some aspects, the number S PUSCH opportunities of CG-UL 753 may be determined according to the schemes of FIG. 8A-8C, 9A-9B, or 10A-D as discussed below. In some aspects, the PUSCH opportunities of CG-UL 753 may be configured with a PUSCH repetition type B associated with a relatively (compared to type A) decreased time spacing or gap between repetitions.

As illustrated in FIG. 7E, CG-UL 754 may include a set of PUSCH opportunities configured in contiguous TDRAs. In some aspects, a PUSCH 794*a* may comprise multiple OFDM symbols such as six symbols. In some aspects, multiple PUSCHs 794*a* are configured in the same slot 794*b*.

In some aspects, CG-UL 754 may include a set of S=2 PUSCH opportunities. In some aspects, the number S PUSCH opportunities of CG-UL 754 may be determined according to the schemes of FIGS. 8A-8C as discussed below. In some aspects, the PUSCH opportunities of CG-UL 754 may be configured with a PUSCH repetition type B.

Figure 7F:
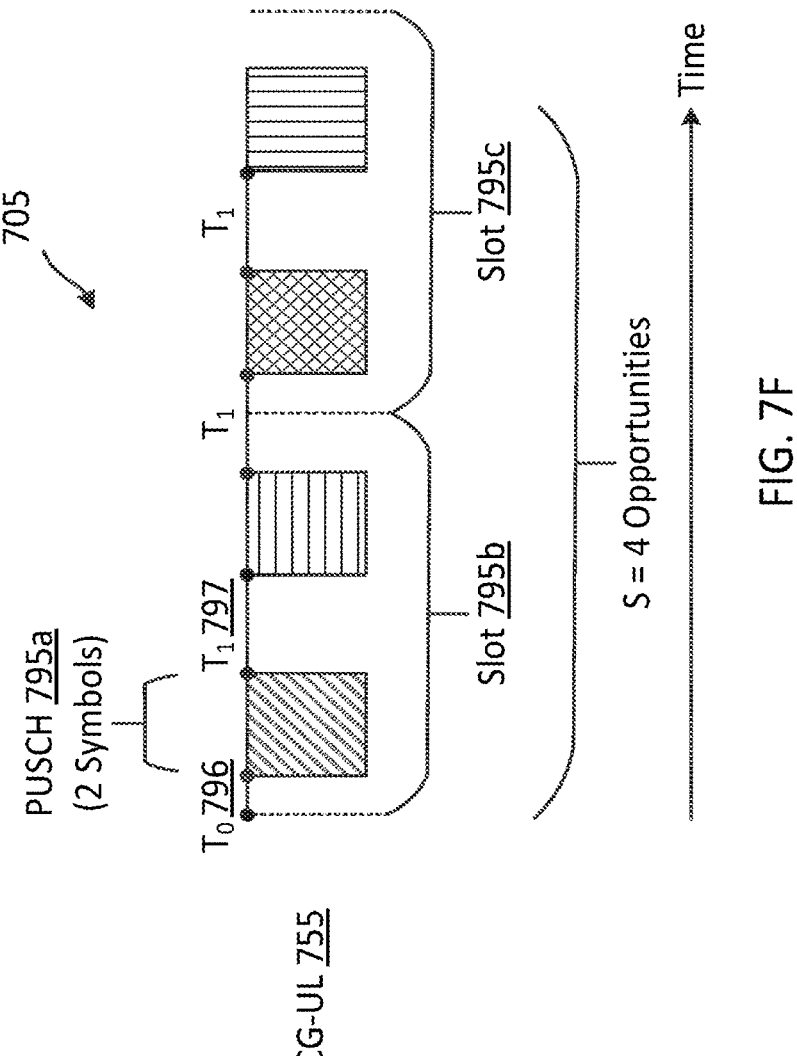

As illustrated in FIG. 7F, CG-UL 755 may include a set of PUSCH opportunities configured in non-contiguous TDRAs. In some aspects, a PUSCH 795*a* may comprise multiple OFDM symbols such as two symbols. In some aspects, multiple PUSCHs 795*a* are configured in the same slot 795*b*. In some aspects, CG-UL 755 may include a set of S=4 PUSCH opportunities. In some aspects, the number S PUSCH opportunities of CG-UL 755 may be determined according to the schemes of FIG. 8A-8C, 9A-9B, or 10A-D as discussed below.

In some aspects, the timing of PUSCHs 795*a* of CG-UL 755 are configured based on one or both of the parameters $T_0$ 796 indicating an offset of the first PUSCH opportunity from the beginning of the slot and $T_1$ 797 indicating a spacing between PUSCHs 795*a*. In some aspects, CG-UL 755 may be associated with a repetition factor K in addition to parameters $T_0$ 796 and $T_1$ 797. In some aspects, CG-UL 755 may be associated with a parameter indicating the size of each PUSCH opportunity in terms of a number of PUSCHs of the configured grant resource. In the scenario where the number of opportunities in CG-UL 755 is based on a parameter or opportunity factor indicating the size of each opportunity based on a number of PUSCHs, the number of opportunities in the CG-UL may be determined independent of the redundancy version (RV) configuration. In some aspects, the network and/or BS may flexibly configure a RV sequence associated with CG-UL 755 using any sequence. In some aspects, the PUSCH opportunities of CG-UL 755 may be configured with a PUSCH repetition type B and the parameter $T_1$ 797.

Figures 8A, 8B, 8C:
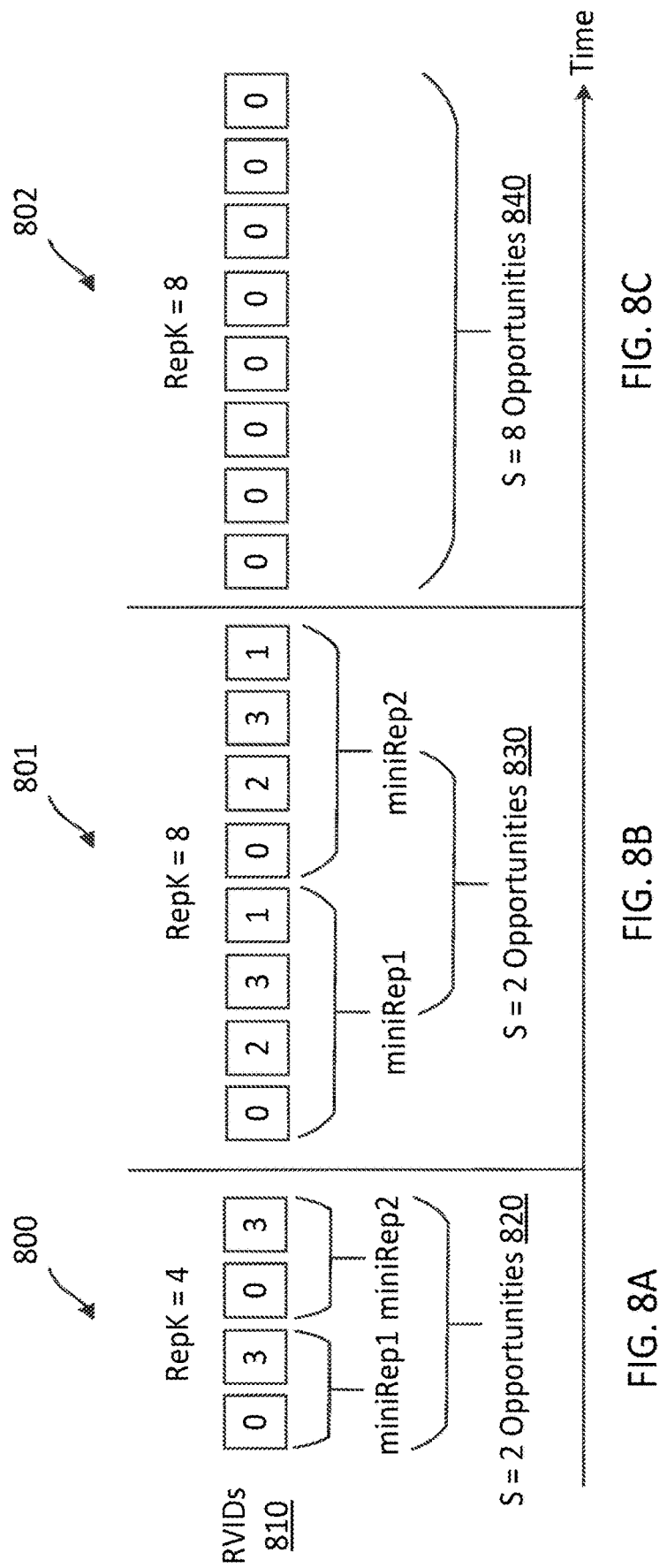
FIGS. 8A-8C illustrate uplink transmission schemes using configured grant resources according to some aspects of the present disclosure.

FIGS. 8A-8C illustrate uplink transmission schemes using configured grant resources according to some aspects of the present disclosure. The functionality of schemes 800 to 802 can be executed by a computing device (e.g., a processor, processing circuit, and/or other suitable component) of a wireless communication device or other suitable means. In some aspects, a wireless communication device such as the UE 115 or UE 500 may utilize one or more components, such as the processor 502, the memory 404, the CG-PUSCH module 508, the transceiver 510, the modem 512, and the one or more antennas 516, to execute the steps of schemes 800 to 802. Further, a wireless communication device such as the base station (BS) 105 or BS 600 may utilize one or more components, such as the processor 602, the memory 604, the CG-PUSCH module 608, the transceiver 610, the modem 612, and the one or more antennas 616, to execute the steps of schemes 800 to 802. The schemes 800 to 802 may employ similar mechanisms as described in FIGS. 1-7 and 9-11. In FIGS. 8A-8C, the x-axis represents time in some arbitrary units.

As illustrated in FIG. 8A, PUSCHs of a CG-UL may be associated with a redundancy version identifier (RVID) or set of RVIDs 810. In some aspects, the PUSCHs of scheme 801 may be associated with a repetition factor (RepK). In some aspects, in scheme 800, RepK may be set equal to four. In some aspects, the RVIDs 810 associated with the PUSCHs of scheme 800 may be based on the sequence 0, 3, 0, 3. In some aspects, a beginning of a PUSCH opportunity may be associated with a PUSCH having RVID=0 and the end of the PUSCH opportunity may be associated with the next PUSCH in RVID sequence 810 having RVID=0. In some aspects, a PUSCH opportunity may be associated with a miniature repetition miniRep1 or miniRep2. In some aspects, miniRep1 and miniRep2 are each associated with multiple PUSCHs such as 2 PUSCHs. In some aspects, the PUSCH opportunities of scheme 800 may be configured with a PUSCH repetition type A or B and/or the parameter $T_1$ 797 of FIG. 7F.

As illustrated in FIG. 8B, PUSCHs of a CG-UL may be associated with a redundancy version identifier (RVID) or set of RVIDs 810. In some aspects, the PUSCHs of scheme 801 may be associated with a repetition factor (RepK). In some aspects, in scheme 801, RepK may be set equal to eight. In some aspects, the RVIDs 810 associated with the PUSCHs of scheme 801 may be based on the sequence 0, 2, 3, 1. In some aspects, a beginning of a PUSCH opportunity may be associated with a PUSCH having RVID=0 and the end of the PUSCH opportunity may be associated with the next PUSCH in RVID sequence 810 having RVID=0. In some aspects, a PUSCH opportunity may be associated with a miniature repetition miniRep1 or miniRep2. In some aspects, miniRep1 and miniRep2 are each associated with multiple PUSCHs such as four PUSCHs. In some aspects, the PUSCH opportunities of scheme 801 may be configured with a PUSCH repetition type A or B and/or the parameter $T_1$ 797 of FIG. 7F.

As illustrated in FIG. 8C, PUSCHs of a CG-UL may be associated with a redundancy version identifier (RVID) or set of RVIDs 810. In some aspects, the PUSCHs may be associated with a repetition factor (RepK). In some aspects, in scheme 802, RepK may be set equal to eight. In some aspects, the RVIDs 810 associated with the PUSCHs of scheme 802 may all be set as RVID=0. In some aspects, a beginning of a PUSCH opportunity may be associated with a PUSCH having RVID=0 and the end of the PUSCH opportunity may be associated with the next PUSCH in RVID sequence 810 having RVID=0. In some aspects, the PUSCH opportunities of scheme 802 may each consist of a single PUSCH. In some aspects, the PUSCH opportunities of scheme 802 may be configured with a PUSCH repetition type A or B and/or the parameter $T_1$ 797 of FIG. 7F.

Figures 9A, 9B:
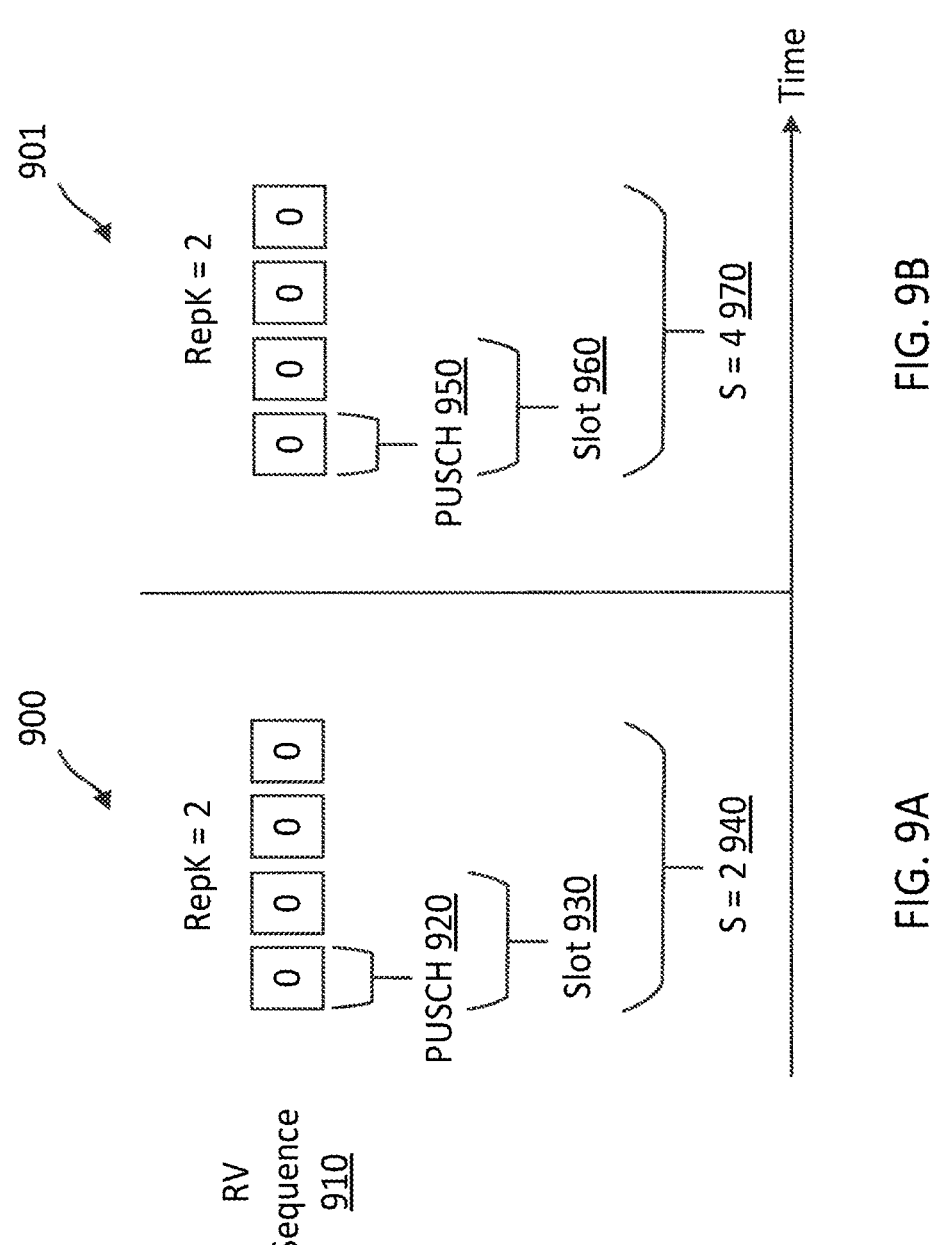
FIGS. 9A-9B illustrate uplink transmission schemes using configured grant resources according to some aspects of the present disclosure.

FIGS. 9A-9B illustrate uplink transmission schemes using configured grant resources according to some aspects of the present disclosure. The functionality of schemes 900 to 901 can be executed by a computing device (e.g., a processor, processing circuit, and/or other suitable component) of a wireless communication device or other suitable means. In some aspects, a wireless communication device such as the UE 115 or UE 500 may utilize one or more components, such as the processor 502, the memory 404, the CG-PUSCH module 508, the transceiver 510, the modem 512, and the one or more antennas 516, to execute the steps of schemes 900 and 901. Further, a wireless communication device such as the base station (BS) 105 or BS 600 may utilize one or more components, such as the processor 602, the memory 604, the CG-PUSCH module 608, the transceiver 610, the modem 612, and the one or more antennas 616, to execute the steps of schemes 900 and 901. The schemes 900 and 901 may employ similar mechanisms as described in FIGS. 1-8 and 10-11. In FIGS. 9A-9B, the x-axis represents time in some arbitrary units.

As illustrated in FIG. 9A, the PUSCHs of a CG-UL may be associated with a RV sequence 910. In some aspects, the PUSCHs may be associated with a repetition factor (RepK). In some aspects, in scheme 900, RepK may be set equal to two. In some aspects, the RV sequence associated with the PUSCHs of scheme 900 may all be set as RVID=0. In some aspects, a number M of PUSCHs 920 may be configured in a slot 930. In some aspects, a number M of PUSCHs 920 configured in a slot 930 is associated with the parameter cg-nrofPUSCH-InSlot-r16 of 3GPP Technical Specification (TS) 38.831. In some aspects, a number N of slots 930 may be configured in a CG-UL. In some aspects, a number N of slots 930 may be configured in a CG-UL is associated with the parameter cg-nrofSlots-r16 of 3GPP Technical Specification (TS) 38.831. In some aspects, the number of PUSCH opportunities S in the CG-UL of scheme 900 is based on N*M/K. In some aspects, a number S 940 of PUSCH opportunities may be S=2.

As illustrated in FIG. 9B, the PUSCHs of a CG-UL may be associated with a RV sequence 910. In some aspects, the PUSCHs may be associated with a repetition factor (RepK). In some aspects, in scheme 901, RepK may be set equal to two. In some aspects, the RV sequence associated with the PUSCHs of scheme 901 may all be set as RVID=0. In some aspects, a number M of PUSCHs 950 may be configured in a slot 960. In some aspects, a number M of PUSCHs 950 configured in a slot 960 is associated with the parameter cg-nrofPUSCH-InSlot-r16 of 3GPP Technical Specification (TS) 38.831. In some aspects, a number N of slots 960 may be configured in a CG-UL. In some aspects, a number N of slots 960 may be configured in a CG-UL is associated with the parameter cg-nrofSlots-r16 of 3GPP Technical Specification (TS) 38.831. In some aspects, the number of PUSCH opportunities S in the CG-UL of scheme 901 is based on N*M. In some aspects, a beginning of a PUSCH opportunity may be associated with a PUSCH having RVID=0 and the end of the PUSCH opportunity may be associated with the next PUSCH in RVID sequence 910 having RVID=0. In some aspects, a number S 970 of PUSCH opportunities may be S=4.

Figure 10A:
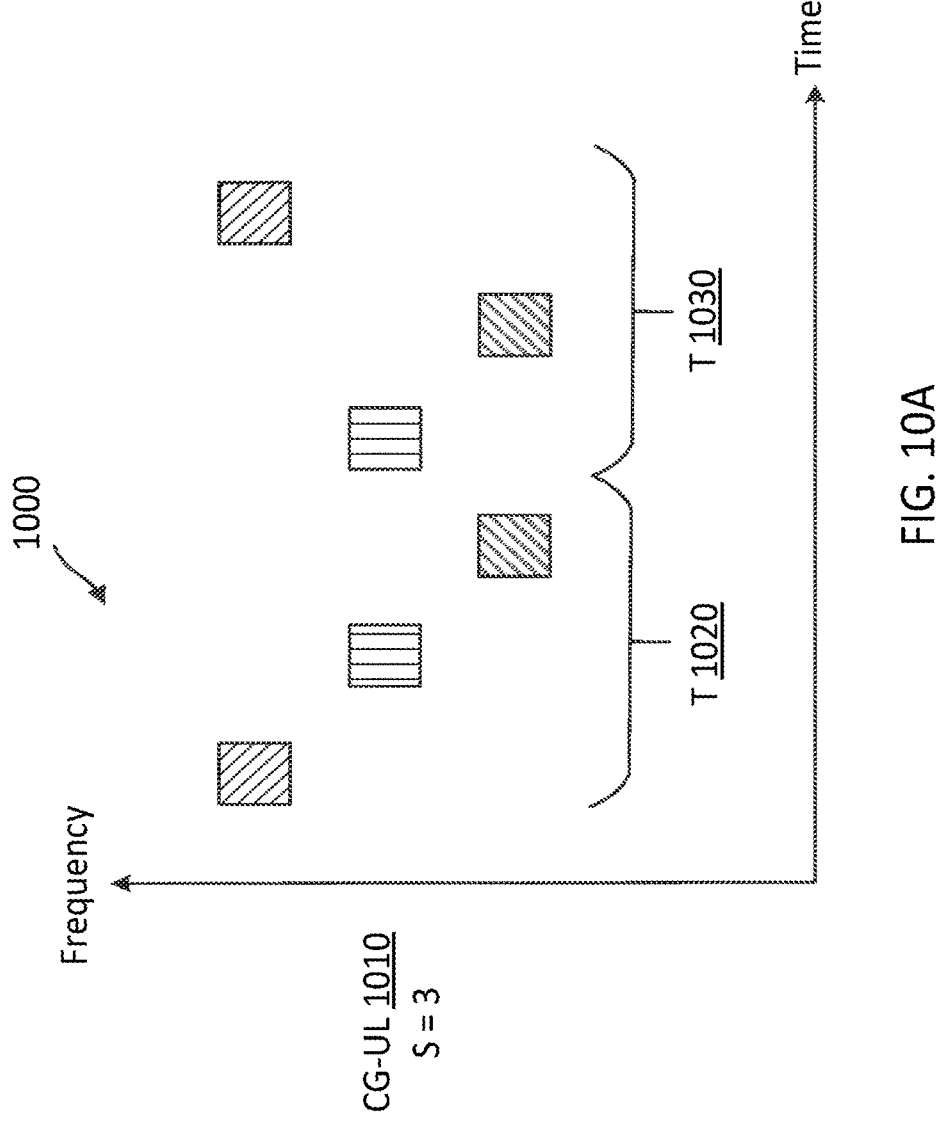
FIGS. 10A-10B illustrate uplink transmission schemes using configured grant resources according to some aspects of the present disclosure.
Figure 10B:
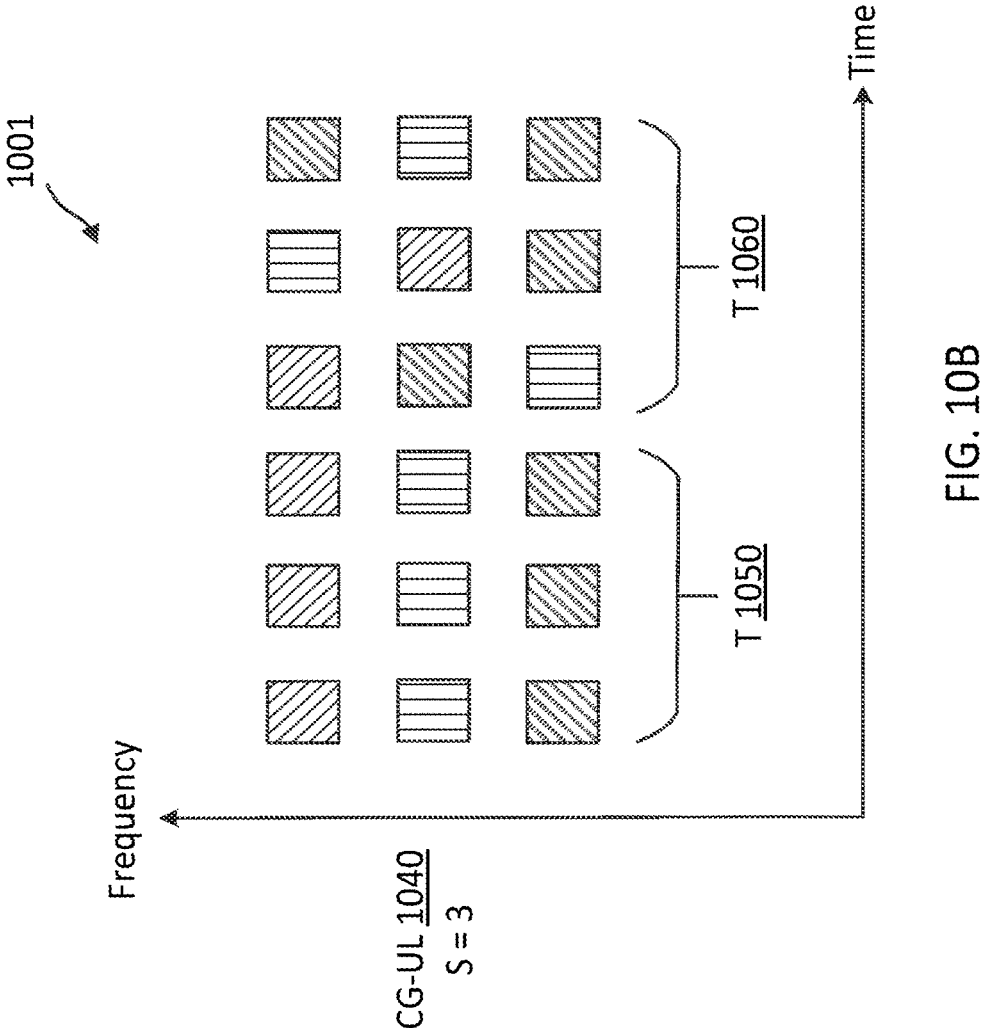

FIGS. 10A-10B illustrate uplink transmission schemes using configured grant resources according to some aspects of the present disclosure. The functionality of schemes 1000 to 1001 can be executed by a computing device (e.g., a processor, processing circuit, and/or other suitable component) of a wireless communication device or other suitable means. In some aspects, a wireless communication device such as the UE 115 or UE 500 may utilize one or more components, such as the processor 502, the memory 404, the CG-PUSCH module 508, the transceiver 510, the modem 512, and the one or more antennas 516, to execute the steps of schemes 1000 to 1001. Further, a wireless communication device such as the base station (BS) 105 or BS 600 may utilize one or more components, such as the processor 602, the memory 604, the CG-PUSCH module 608, the transceiver 610, the modem 612, and the one or more antennas 616, to execute the steps of schemes 1000 to 1001. The schemes 1000 to 1001 may employ similar mechanisms as described in FIGS. 1-9 and 11. In FIGS. 10A-10B, the x-axis represents time in some arbitrary units, and the y-axis represents frequency in some arbitrary units.

As illustrated in FIG. 10A, CG-UL 1010 may be associated with multiple PUSCH opportunities configured in different frequency domain resource allocations (FDRAs). In some aspects, CG-UL 1010 may include S=3 PUSCH opportunities configured in different FDRAs (i.e., different locations on y-axis indicating frequency). In some aspects, all or some the opportunities of CG-UL 1010 may be configured in the same FDRA. In some aspects, the S=3 PUSCH opportunities of scheme 1000 may be configured in different TDRAs (i.e., different locations on the x-axis indicating time) as well as different FDRAs (e.g., frequency hopping techniques). In some aspects, all or some the opportunities of CG-UL 1010 may be configured in the same TDRA. In some aspects, the S=3 PUSCH opportunities of CG-UL 1010 may be configured with different beamforming configurations (e.g., as indicated by the different diagonal and vertical shading patterns). In some aspects, all or some the opportunities of CG-UL 1010 may be configured to have the same beamforming configuration. In some aspects, the patterns of each of the FDRAs and/or the beamforming configurations may be different in each period T 1020 and T 1030 of the CG-UL based on a pre-defined rule. In some aspects, for a type 2 CG-UL, the BS may transmit to the UE DCI including information for activating the PUSCH opportunities in the different FDRAs (or different component carriers). In some aspects, scheme 1000 may be associated with an unlicensed frequency band. In some aspects, the UE selects the PUSCH opportunity of CG-UL 1010 based on a signal-to-interference-plus-noise ratio (SINR) associated with each PUSCH opportunity.

As illustrated in FIG. 10B, CG-UL 1040 may be associated with multiple PUSCH opportunities configured in different frequency domain resource allocations (FDRAs). In some aspects, CG-UL 1040 may include S=9 PUSCH opportunities. In some aspects, the S=9 PUSCH opportunities of CG-UL 1040 may be configured in different TDRAs (i.e., different locations on the x-axis indicating time) and/or different FDRAs (e.g., frequency hopping techniques). In some aspects, the S=9 PUSCH opportunities of CG-UL 1040 may be configured with different beamforming configurations (e.g., as indicated by the different diagonal and vertical shading patterns). In some aspects, the patterns of each of the FDRAs and/or the beamforming configurations may be different in each period T 1050 and T 1060 of the CG-UL based on a pre-defined rule. In some aspects, scheme 1001 may be associated with an unlicensed frequency band. In some aspects, the UE selects the PUSCH opportunity of CG-UL 1040 based on a signal-to-interference-plus-noise ratio (SINR) associated with each PUSCH opportunity. In some aspects, the different component carriers associated with the different FDRAs of CG-UL 1040 may be configured, activated, and reactivated when PUSCH opportunities are allocated to a given component carrier.

FIG. 11 illustrates a flow diagram of a communication method 1100 according to some aspects of the present disclosure. The functionality of method 1100 can be executed by a computing device (e.g., a processor, processing circuit, and/or other suitable component) of a wireless communication device or other suitable means. In some aspects, a wireless communication device such as the UE 115, UE 215, or UE 500 may utilize one or more components, such as the processor 502, the memory 404, the CG module 508, the transceiver 510, the modem 512, and the one or more antennas 516, to execute the steps of method 1100. Further, a wireless communication device such as the base station (BS) 105, BS 205, or BS 600 may utilize one or more components, such as the processor 602, the memory 604, the CG module 608, the transceiver 610, the modem 612, and the one or more antennas 616, to execute the steps of method 1100. The method 1100 may employ similar mechanisms as described in FIGS. 1-10.

As illustrated in FIG. 11, step 1110 includes determining, by a first wireless communication device, a physical uplink shared channel (PUSCH) opportunity set including one or more PUSCH opportunities for communicating in a configured grant resource. In some aspects, each of network 100, BS 105, and UE 115 may perform the determining step 1100 using one or more of a processor, memory, CG module, and/or software, including, for example, the hardware and software components illustrated in FIGS. 5-6. Various algorithms may be used by each entity to perform this step, including, for example, the PUSCH opportunity set determination algorithms described above with respect to FIGS. 3-4 and 7-10.

Step 1120 further includes communicating, by the first wireless communication device with a second wireless communication device, a first communication based on the determined PUSCH opportunity set. In some aspects, each of network 100, BS 105/600, and UE 114/500 may perform the communicating step 1120 using one or more of a processor, memory, CG module, transceiver, and/or software, including, for example, the hardware and software components illustrated in FIGS. 5-6. Various algorithms may be used by each entity to perform this step, including, for example, the PUSCH opportunity set determination algorithms described above with respect to FIGS. 3-4 and 7-10.

In some instances, a configured grant timer is based on one of an ending PUSCH opportunity in the configured grant resource, a beginning PUSCH opportunity in the configured grant resource, or an ending of the first PUSCH opportunity.

In some instances, a communication associated with a dynamic grant resource for retransmission is based on determining, by a BS, a demodulation reference signal (DMRS) search in each PUSCH within the determined PUSCH opportunity set satisfies a threshold.

In some instances, a BS determines a hybrid automatic repeat request (HARQ) combination based on the PUSCH having a largest metric in the demodulation reference signal (DMRS) search.

In some instances, a communication associated with a dynamic grant resource for retransmission is based on a redundancy version (RV).

In some instances, a BS receives a third communication including one or more bits of uplink control information (UCI) indicating that a dynamic grant resource is associated with a false alarm, wherein the receiving the third communication is based on the BS transmitting a fourth communication including one of radio resource control (RRC) information or downlink control information (DCI). In some aspects, the fourth communication may be the same as, or contained within the same message or packet as, the communication, message, or packet received by the UE that configures the dynamic grant resource.

In some instances, wherein a dynamic grant resource is not associated with a false alarm, and wherein the UE transmits one or more bits of uplink control information (UCI) indicating the PUSCH opportunity in which the first communication was communicated.

In some instances, each opportunity of a determined PUSCH opportunity set is configured in a different frequency domain resource allocation (FDRA).

In some aspects, each opportunity of a determined PUSCH opportunity set is configured in a different frequency domain resource allocation (FDRA), and wherein a pattern of the FDRAs is different in each period of the CG-UL based on a pre-defined rule.

In some instances, each opportunity of a determined PUSCH opportunity set is configured with a different beamforming configuration.

In some instances, each opportunity of a determined PUSCH opportunity set is configured with a different beamforming configuration, wherein a pattern of the beamforming configurations is different in each period of the CG-UL based on a pre-defined rule.

In some instances, a communication associated with the determined PUSCH opportunity set is communicated based on a signal-to-interference-plus-noise ratio (SINR) associated with each opportunity of the determined PUSCH opportunity set.

In some instances, a first set of opportunities of the determined PUSCH opportunity set are configured in different frequency domain resource allocations (FDRAs), a second set of opportunities of the determined PUSCH opportunity set are configured with different beamforming configurations, and a third set of opportunities of the determined PUSCH opportunity set are configured in the same time domain resource allocation (TDRA).

In some instances, the first wireless communication device receives the first communication on a physical uplink shared channel (PUSCH) associated with the determined PUSCH opportunity set.

In some instances, the first wireless communication device transmits the first communication on a physical uplink shared channel (PUSCH) associated with the determined PUSCH opportunity set.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
determining, by a first wireless communication device, a physical uplink shared channel (PUSCH) opportunity set including one or more PUSCH opportunities for communicating in a configured grant resource, wherein:
the PUSCH opportunity set includes one of a first set of contiguous time domain resource allocations (TDRAs) or a second set of non-contiguous TDRAs, and
the PUSCH opportunity set is associated with a hybrid automatic repeat request (HARQ) process identifier (ID) based on a first symbol of the configured grant resource;
communicating, by the first wireless communication device with a second wireless communication device, a first communication based on the PUSCH opportunity set, wherein the first communication is communicated based on a first PUSCH opportunity included within the PUSCH opportunity set; and
communicating, by the first wireless communication device with the second wireless communication device, a second communication associated with a dynamic grant resource for retransmission based on the HARQ process ID.

2. The method of claim 1,
wherein a spacing between PUSCH opportunities of the second set of non-contiguous TDRAs is based on an inter-opportunity interval T1.

3. The method of claim 1,
wherein a number of the one or more PUSCH opportunities S is based on an opportunity factor P indicating a number of PUSCHs of the configured grant resource associated with each PUSCH opportunity.

4. The method of claim 1,
wherein the configured grant resource includes a repetition factor K, wherein K is an integer greater than or equal to one (1);
wherein a beginning of the first PUSCH opportunity is based on a first redundancy version (RV) identifier (RVID) being equal to zero (0);
wherein an ending of the first PUSCH opportunity is based on a second RVID being the next RVID equal to zero (0) after the first RVID in a RV sequence; and
wherein a number of the one or more PUSCH opportunities S is based on K.

5. The method of claim 1,
wherein the configured grant resource includes a number of slots N, each slot of the number of slots N including a number of PUSCHs M; and
wherein a number of the one or more PUSCH opportunities S is based on N*M.

6. The method of claim 5,
wherein the configured grant resource includes a repetition factor K, wherein K is an integer greater than or equal to one (1); and
wherein S is further based on N*M/K.

7. The method of claim 5,
wherein a beginning of the first PUSCH opportunity is based on a first redundancy version (RV) identifier (RVID) being equal to zero (0); and

wherein an ending of the first PUSCH opportunity is based on a second RVID being the next RVID equal to zero (0) after the first RVID in a RV sequence.

8. The method of claim 1,
wherein a configured grant timer is based on one of an ending PUSCH opportunity in the configured grant resource, a beginning PUSCH opportunity in the configured grant resource, or an ending of the first PUSCH opportunity.

9. The method of claim 1, further comprising:
determining, by the first wireless communication device, a demodulation reference signal (DMRS) search in each PUSCH within the PUSCH opportunity set satisfies a threshold; and
determining, by the first wireless communication device, a HARQ combination based on a PUSCH having a largest metric in the DMRS search,
wherein the communicating the second communication is further based on a redundancy version (RV).

10. The method of claim 9, further comprising:
transmitting, by the first wireless communication device to the second wireless communication device, a third communication including one of radio resource control (RRC) information or downlink control information (DCI); and
receiving, by the first wireless communication device from the second wireless communication device and based on transmission of the third communication, a fourth communication including one or more bits of uplink control information (UCI) indicating that the dynamic grant resource is associated with a false alarm.

11. The method of claim 9,
wherein the dynamic grant resource is not associated with a false alarm, and wherein the method further includes:
receiving, from the second wireless communication device, one or more bits of uplink control information (UCI) indicating the first PUSCH opportunity.

12. The method of claim 1,
wherein each PUSCH opportunity of the PUSCH opportunity set is configured in a different frequency domain resource allocation (FDRA).

13. The method of claim 12,
wherein a pattern of the FDRAs is different in each period of the configured grant resource based on a pre-defined rule.

14. The method of claim 1,
wherein each PUSCH opportunity of the PUSCH opportunity set is configured with a different beamforming configuration; and
wherein the method further comprises:
determining, by the first wireless communication device, a signal-to-interference-plus-noise ratio (SINR) associated with each PUSCH opportunity of the PUSCH opportunity set.

15. The method of claim 14,
wherein a pattern of the beamforming configurations is different in each period of the configured grant resource based on a pre-defined rule.

16. The method of claim 1,
wherein a first subset of PUSCH opportunities in the PUSCH opportunity set are configured in different frequency domain resource allocations (FDRAs);
wherein a second subset of PUSCH opportunities in the PUSCH opportunity set are configured with different beamforming configurations; and

wherein a third subset of PUSCH opportunities in the PUSCH opportunity set are configured in a same TDRA.

17. The method of claim 1,
wherein the communicating the first communication comprises:
receiving, by the first wireless communication device, the first communication on a PUSCH associated with the PUSCH opportunity set.

18. The method of claim 1,
wherein the communicating the first communication comprises:
transmitting, by the first wireless communication device, the first communication on a PUSCH associated with the PUSCH opportunity set.

19. A first wireless communication device, comprising:
a processor configured to:
determine a physical uplink shared channel (PUSCH) opportunity set including one or more PUSCH opportunities for communicating in a configured grant resource, wherein:
the PUSCH opportunity set includes one of a first set of contiguous time domain resource allocations (TDRAs) or a second set of non-contiguous TDRAs, and
the PUSCH opportunity set is associated with a hybrid automatic repeat request (HARQ) process identifier (ID) based on a first symbol of the configured grant resource; and
a transceiver configured to:
communicate, with a second wireless communication device, a first communication based on the PUSCH opportunity set, wherein the first communication is communicated based on a first PUSCH opportunity included within the PUSCH opportunity set; and
communicate, with the second wireless communication device, a second communication associated with a dynamic grant resource for retransmission based on the HARQ process ID.

20. The first wireless communication device of claim 19,
wherein the configured grant resource includes a number of slots N, each slot of the number of slots N including a number of PUSCHs M; and
wherein a number of the one or more PUSCH opportunities S is based on N*M.

21. The first wireless communication device of claim 20,
wherein the configured grant resource includes a repetition factor K, wherein K is an integer greater than or equal to one (1); and
wherein S is further based on N*M/K.

22. The first wireless communication device of claim 20,
wherein a beginning of the first PUSCH opportunity is based on a first redundancy version (RV) identifier (RVID) being equal to zero (0); and
wherein an ending of the first PUSCH opportunity is based on a second RVID being the next RVID equal to zero (0) after the first RVID in a RV sequence.

23. The first wireless communication device of claim 19,
wherein a configured grant timer is based on one of an ending PUSCH opportunity in the configured grant resource, a beginning PUSCH opportunity in the configured grant resource, or an ending of the first PUSCH opportunity.

24. The first wireless communication device of claim 19,
wherein the transceiver is further configured to;
communicate the second communication based on a demodulation reference signal (DMRS) search in each PUSCH within the PUSCH opportunity set satisfying a threshold; and communicate the second communication based on a redundancy version (RV); and wherein the processor is further configured to:

determine a HARQ combination based on a PUSCH having a largest metric in the DMRS search.

25. The first wireless communication device of claim 19, wherein each PUSCH opportunity of the PUSCH opportunity set is configured in a different frequency domain resource allocation (FDRA).

26. The first wireless communication device of claim 19, wherein each PUSCH opportunity of a PUSCH opportunity set is configured in a different frequency domain resource allocation (FDRA); and wherein a pattern of the FDRAs is different in each period of the configured grant resource based on a pre-defined rule.

27. The first wireless communication device of claim 19, wherein each PUSCH opportunity of the PUSCH opportunity set is configured with a different beamforming configuration; and wherein the processor is further configured to:

determine a signal-to-interference-plus-noise ratio (SINR) associated with each PUSCH opportunity of the PUSCH opportunity set.

28. The first wireless communication device of claim 27, wherein a pattern of the beamforming configurations is different in each period of the configured grant resource based on a pre-defined rule.

29. The first wireless communication device of claim 19, wherein a first subset of PUSCH opportunities in the PUSCH opportunity set are configured in different frequency domain resource allocations (FDRAs);

wherein a second subset of PUSCH opportunities in the PUSCH opportunity set are configured with different beamforming configurations; and wherein a third subset of PUSCH opportunities in the PUSCH opportunity set are configured in a same TDRA.

30. The first wireless communication device of claim 19, wherein the transceiver is further configured to:

receive the first communication on a PUSCH associated with the PUSCH opportunity set.

31. The first wireless communication device of claim 19, wherein the transceiver is further configured to:

transmit the first communication on a PUSCH associated with the PUSCH opportunity set.

32. A non-transitory computer-readable medium having program code recorded thereon, the program code, when executed by a processor in a first wireless communication device, comprising code for causing the first wireless communication device to:

determine a physical uplink shared channel (PUSCH) opportunity set including one or more PUSCH opportunities for communicating in a configured grant resource, wherein:

the PUSCH opportunity set includes one of a first set of contiguous time domain resource allocations (TDRAs) or a second set of non-contiguous TDRAs, and the PUSCH opportunity set is associated with a hybrid automatic repeat request (HARQ) process identifier (ID) based on a first symbol of the configured grant resource;

communicate, with a second wireless communication device, a first communication based on the PUSCH opportunity set, wherein the first communication is communicated based on a first PUSCH opportunity included within the PUSCH opportunity set; and communicate, with the second wireless communication device, a second communication associated with a dynamic grant resource for retransmission based on the HARQ process ID.

33. The non-transitory computer-readable medium of claim 32, wherein a number of the one or more PUSCH opportunities S is based on an opportunity factor P indicating a number of PUSCHs of the configured grant resource associated with each PUSCH opportunity.

34. The non-transitory computer-readable medium of claim 32, wherein the configured grant resource includes a repetition factor K, wherein K is an integer greater than or equal to one (1);

wherein a beginning of the first PUSCH opportunity is based on a first redundancy version (RV) identifier (RVID) being equal to zero (0);

wherein an ending of the first PUSCH opportunity is based on a second RVID being the next RVID equal to zero (0) after the first RVID in a RV sequence; and wherein a number of the one or more PUSCH opportunities S is based on K.

35. A first wireless communication device, comprising:

means for determining, by a first wireless communication device, a physical uplink shared channel (PUSCH) opportunity set including one or more PUSCH opportunities for communicating in a configured grant resource, wherein:

the PUSCH opportunity set includes one of a first set of contiguous time domain resource allocations (TDRAs) or a second set of non-contiguous TDRAs, and the PUSCH opportunity set is associated with a hybrid automatic repeat request (HARQ) process identifier (ID) based on a first symbol of the configured grant resource;

means for communicating, by the first wireless communication device with a second wireless communication device, a first communication based on the PUSCH opportunity set, wherein the first communication is communicated based on a first PUSCH opportunity included within the PUSCH opportunity set; and means for communicating, by the first wireless communication device with the second wireless communication device, a second communication associated with a dynamic grant resource for retransmission based on the HARQ process ID.

* * * * *